US009552569B1

(12) United States Patent
Quan et al.

(10) Patent No.: US 9,552,569 B1
(45) Date of Patent: Jan. 24, 2017

(54) REMOVABLE AND REUSABLE DEVICE FOR OBJECT TRACKING

(71) Applicant: Amazon Technologies, Inc., Seattle, WA (US)

(72) Inventors: Adrian Christopher Quan, Bainbridge Island, WA (US); Kimberly Anne Lewis, Seattle, WA (US); Jamie Marie Holland, Seattle, WA (US); Allan Scott Bathurst, Seattle, WA (US); Wesley Scott Lauka, Seattle, WA (US); Ryan Scott Russell, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/864,344

(22) Filed: Sep. 24, 2015

(51) Int. Cl.
G06F 19/00 (2011.01)
G06Q 30/00 (2012.01)
G06Q 90/00 (2006.01)
G06Q 10/08 (2012.01)

(52) U.S. Cl.
CPC ................... *G06Q 10/087* (2013.01)

(58) Field of Classification Search
CPC .......... G06F 19/00; G06F 17/00; G06Q 30/00; G06Q 90/00; G06Q 20/00; G06Q 10/00; G06K 19/00; G06G 1/14
USPC ....................... 235/385, 375, 487; 705/22, 28
See application file for complete search history.

(56) References Cited

U.S. PATENT DOCUMENTS

| | | | |
|---|---|---|---|
| 8,280,547 B2 | 10/2012 | D'Andrea et al. | |
| 9,087,314 B2 | 7/2015 | Hoffman et al. | |
| 2003/0209601 A1* | 11/2003 | Chung | H04L 63/12 235/385 |
| 2004/0169587 A1* | 9/2004 | Washington | G06K 7/10079 340/573.1 |
| 2004/0233065 A1* | 11/2004 | Freeman | G06K 7/10079 340/8.1 |
| 2005/0030160 A1* | 2/2005 | Goren | G06K 7/0008 340/10.5 |
| 2011/0207429 A1* | 8/2011 | Maier | H04W 64/00 455/404.2 |

(Continued)

OTHER PUBLICATIONS

U.S. Appl. No. 14/864,503, filed Sep. 24, 2015, Titled: Removable and Reusable Tracking Device Item Reordering.

Primary Examiner — Edwyn Labaze
(74) Attorney, Agent, or Firm — Kilpatrick Townsend & Stockton LLP

(57) ABSTRACT

Techniques for providing a removable and reusable tracking device feature in an inventory management system may be described. For example, an inventory transfer request may be received for transferring inventory within a facility. A first indication may be received that indicates one or more reusable tracking devices are associated with the inventory included in the inventory transfer request. Information about the inventory transfer request may be mapped to the association of the one or more reusable tracking devices and the inventory. In an embodiment, a location of the inventory may be determined based on location information provided by the associated one or more reusable tracking devices. The mapping between the inventory transfer information to the one or more reusable tracking devices and the inventory may be removed based at least in part on the location information indicating that the inventory is located at a particular location within the facility.

17 Claims, 12 Drawing Sheets

(56) References Cited

U.S. PATENT DOCUMENTS

2012/0075071 A1\*  3/2012  Liu ..................... B65D 19/001
                                                340/10.1

\* cited by examiner

REMOVABLE AND REUSABLE DEVICE FOR OBJECT TRACKING

BACKGROUND

Modern inventory systems, such as those in mail order warehouses, supply chain distribution centers, airport luggage systems, and customer-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory request, inefficient utilization of system resources, including space, equipment, and manpower, can result in lower throughput, unacceptably long response times, an ever increasing backlog of unfinished tasks, and in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which.

DETAILED DESCRIPTION

Figure 1:
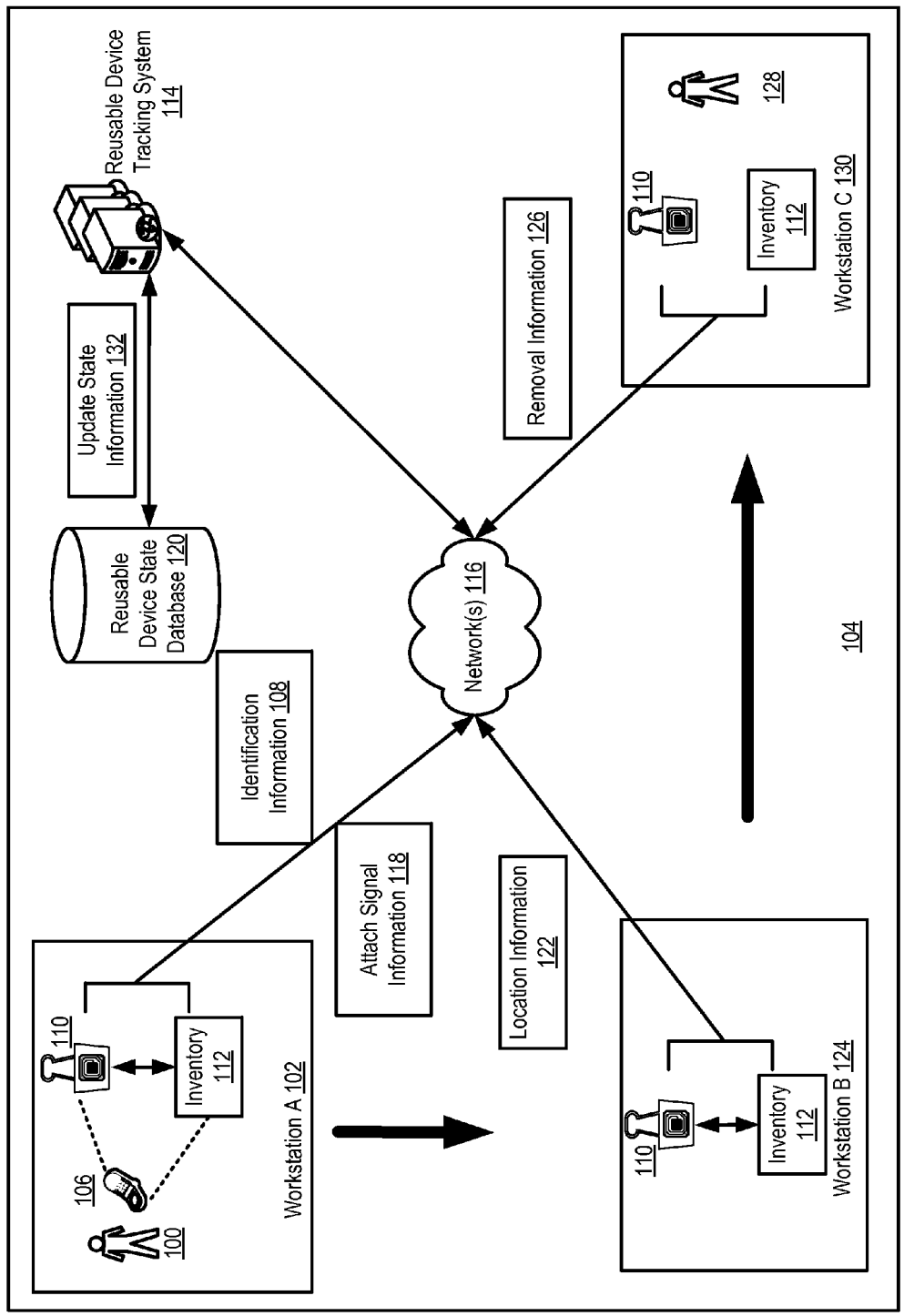
FIG. 1 illustrates an example data flow for a reusable tracking device feature in an inventory management system as described herein, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to a removable and reusable tracking device feature for tracking inventory within an inventory management system. Specifically, features herein are directed to managing an association between a removable and reusable tracking device, such as a radio frequency identification (RFID) tag, and an item of inventory that can be utilized to determine a location of the item and the reusable tracking device within the inventory management system. As described herein, an item that has the reusable tracking device attached thereto may be referred to as a tracked item. Inventory may be transferred to or from one or more containers that are stored in one or more container holders that are located in a facility (e.g., a workspace) within the inventory management system. The container holders may operate within a storage area of the facility and hold inventory items (within the containers) going to or coming from the storage area. The container holders may be placed in the storage area next to other container holders to form one or more rows of dense storage. The facility may include an inventory processing area which includes those areas where inventory is processed (e.g., receiving areas, picking areas, stowing areas, packing areas, shipping areas, consolidation areas, quality control areas, and any other suitable areas within the facility). Inventory transfer stations may be located in any of the inventory processing areas for processing inventory within the facility. The inventory processing area may be separate from the storage area. Inventory processing may occur at the inventory transfer stations by an operator who transfers inventory to or from container holders that are provided by other operators, automated machinery, or an unmanned mobile drive unit, for example. Inventory transfer can be in response to an order for an item (fulfillment of orders for items), stowing of items in containers for movement to other areas of the facility (consolidation), or transfer of inventory from one facility to another, by the operator at the inventory transfer stations.

In embodiments, an operator may operatively attach a removable and reusable tracking device to an item or inventory, thereby creating a tracked item and placing the particular removable and reusable tracking device in an active state, at an inventory transfer station in response to an inventory transfer request or as part of inventory processing. Unique identification information associated with the item and the removable and reusable tracking device may be provided to a management module within the facility. The identification information may be utilized by the management module to associate the removable and reusable tracking device to the item and map the association to a particular inventory transfer request. In accordance with at least one embodiment, as the tracked item moves throughout the facility or inventory management system as part of inventory processing, various readers, scanners, operators, or portions of the inventory management system may provide signals that include information indicating a location of the removable and reusable tracking device to the management module. The management module may utilize the location information from the particular removable and reusable tracking device and information about the entity providing or relaying the location information (such as location information for the entity within the facility or a unique identifier for the entity) to perform a mapping that enables determination of the location of the tracked item within the facility at any particular time. In embodiments, the management module may perform a mapping between a layout of the facility and the location of the entity providing the location information to determine a relative location of the tracked item. In an embodiment, upon the tracked item being located within a particular location within the facility, an operator may remove or detach the removable and reusable tracking device from the item. The operator may interact with the removable and reusable tracking device, via a scanner or reader, to provide information about the detachment or an idle state signal to the management module. The management module may utilize the detachment information or idle state signal to delete the association between the particular removable and reusable tracking device and the particular item thereby placing the removable and reusable tracking device in an idle state. The idle state removable and reusable tracking device may then be utilized to track a new item for inventory processing throughout the facility as the management module can create a new association with the idle removable and reusable tracking device. In an embodiment, the removable and reusable tracking device may be configured to provide a signal or data indicating the detachment from an inventory item or distress signal, to any nearby access points that are situated within the inventory management system, during inventory processing. The distress signal may aid operators and facilities in locating a particular item within the facility as the management module may determine a location of the removable and reusable tracking device given the location of the receiving access point and the last known location of the item when the tracking device was still attached to the item.

In an example, an operator processing inventory at an inventory transfer station within a facility may scan or read a machine readable identifier associated with an RFID tag and attach the RFID tag to an item. The operator may scan or read a unique identifier associated with the item. A computer system implementing a management module may associate the item and the RFID tag based on the received identifier information and map the association to a particular inventory transfer request. Thereafter, the tracked item may provide location information, via access points located within the facility, to the management module. The management module can utilize the location information along with the identity of the access point providing the location information to determine a relative location of the tracked item within the facility. At any point during inventory processing an operator may detach the RFID tag and send a deactivate or idle signal to the management module, via a user device or via a button configured to send such information. The management module may remove or delete the association between the RFID tag and the item thereby enabling the RFID tag to be associated with a different item for tracking. In an embodiment, the removal of the RFID tag from the item may trigger the provision of the deactivate or idle signal to the management module without any further steps being taken by an operator.

In embodiments, a removable and reusable tracking device may be associated with and attached to an item of inventory before delivery to an intended recipient. Upon the recipient interacting with or removing the reusable tracking device, information may be provided by the removable and reusable tracking device, via available networks, to the management module. Available networks include at least wireless networks, 2G, 3G, 4G, Bluetooth, or any other suitable networks for providing information to the management module. The management module can determine an appropriate time to fulfill a re-order or resupply of the item to which the removable and reusable tracking device was attached based on the removal indication. The management module may provide instructions to an electronic marketplace to re-order the particular item on behalf of the user based on information associated with the user, such as address and billing information, and a signal from the removable and reusable tracking device indicating that the device has been detached or removed from the particular item. In embodiments, the user may utilize a user device, such as a mobile device, to provide information to the management module to associate the removable and reusable tracking device to an item currently in their possession. The management module may, upon receiving a detach or removal signal from the removable and reusable tracking device, order the item for delivery on behalf of the user. The removable and reusable tracking device in addition to performing the functionality described herein may also serve other utilitarian functions such as sealing an item from exposure, visually distinguishing the item from other similar items, or being a part of or component for storing the item (such as a clip or loop with which to store the item).

In an example, a user may place an order for tortilla chips from an electronic marketplace utilizing a web service associated with the electronic marketplace. An operator processing the order for tortilla chips may interact with a removable and reusable tracking device and the tortilla chips to provide identification information to a management module of the inventory management system processing the order. The management module may associate the removable and reusable tracking device to the tortilla chips and map the association to the order on behalf of the user. The operator may attach the removable and reusable tracking device to the tortilla chips and process the tracked item for delivery to the user. Upon the user removing or detaching the removable and reusable tracking device from the tortilla chips, the tracking device may provide, via any available network, a detach signal to the management module. The management module may determine an appropriate length of time before processing a reorder for the tortilla chips. The length of time may be determined by the management module based on information associated with the tortilla chips, such as typical shelf life or historical re-order time periods associated with the tortilla chips, and the detach or removal signal from the removable and reusable tracking device. The management module may provide a notification to the user, via a user device, querying the user whether they wish to proceed with the re-order of the tortilla chips upon expiration of the determined time period.

FIG. 1 illustrates an example data flow for a reusable tracking device feature in an inventory management system as described herein, according to embodiments. The data flow of FIG. 1 includes an operator 100 processing inventory at Workstation A 102 within a facility 104. The operator 100 may utilize a user device 106 to provide identification information 108 from a removable and reusable tracking device 110 and inventory 112 to a reusable device tracking system 114 via an access point (not pictured) and one or more available networks 116. The reusable device tracking system 114 may include one or more computer systems that implement the management module described herein. The removable and reusable tracking device 110 may provide attach information or active signal information 118 to the reusable device tracking system 114 via networks 116 upon the operator 100 attaching the device 110 to the inventory 112, described below, at workstation A 102 thereby creating a tracked item (the attachment in FIG. 1 is represented by the double sided arrow between the reusable tracking device 110 and inventory 112). The reusable device tracking system 114 may associate the removable and reusable tracking device 110 and the inventory 112 based on the identification information 108 and the attach signal information 118. The association may be mapped to an inventory transfer request for the inventory 112. The reusable device tracking system 114 may store the association and the current state of the removable and reusable tracking device 110 in a database such as database 120.

As the tracked item (110 and 112) is moved throughout the facility 104, the removable and reusable tracking device 110 may provide location information 122 to the reusable device tracking system 114. For example, as the tracked item is moved to Workstation B 124, the removable and reusable tracking device 110 may provide location information 122 to the reusable device tracking system 114 via an access point near Workstation B 124 and networks 116. In embodiments, the location information 122 may include an indication that the removable and reusable tracking device 110 is still attached to the inventory 112 and the access point may append its own location within the facility 104 to the reusable device tracking system 114 to aid in determining the location of the tracked item (110 and 112). In an embodiment, an operator processing inventory at Workstation B 124 may interact with the tracked item (110 and 112) via a user device, such as machine readable identifier scanning device, to provide the location information 122 to the reusable device tracking system 114.

For example, the operator, scanning device, or work station may be associated with an identifier that the reusable device tracking system 114 may map to a particular location within the facility. As an operator interacts with the tracked item (110 and 112) within the facility 104 the reusable device tracking system 114 can utilize the identifier of the entity providing the location information (operator, scanning device, workstation, particular access point within the facility) and the attach signal information 118 to determine the relative location of the tracked item (110 and 112) and that the device is still attached to the inventory. Each workstation or inventory processing area within the facility 104 may be configured to scan, read, or interact with the removable and reusable tracking device 110 to automatically provide the location information 122 to the reusable device tracking system 114. For example, each workstation, such as Workstation B 124 may be configured to utilize one or more cameras, barcode readers, RFID tag readers, near field communication (NFC) sensors, or any other suitable signal communication technology to interact with the tracked item (110 and 112) to provide attach signal information 118 and location information 122 to the reusable device tracking system 114. In an embodiment, the reusable device tracking system 114 may maintain a log or history of locations, in database 120, for each tracked item within the facility that is dynamically updated based on newly received location information 122 from each tracked item within the facility at any given time. In embodiments, the reusable device tracking system 114 may maintain information, provided by the removable and reusable tracking device 110, that indicates the time period between communication between the removable and reusable tracking device 110 and information transferring entities such as workstations (102, 124, 130), network access points located throughout the workspace 104, wireless routers, RFID readers/scanners, or particular locations of the workspace 104 configured to provide signals and information from the removable and reusable tracking device 110 to the reusable device tracking system 114. Time period thresholds may be maintained and compared to the time period to determine whether a distress signal should be provided or activated by the removable and reusable tracking device 110 that alarms nearby entities that the tracked item (110 and 112) is located in an improper location within the workspace 104. The reusable device tracking system 114 may update the time period thresholds depending on the location of the tracked item (110 and 112) or according to the step of inventory processing that the tracked item (110 and 112) is currently going through.

It should be appreciated that one or more components of a facility may be utilized to provide the location information or information that can be utilized by the reusable device tracking system 114 to determine the location of reusable tracking devices, such as reusable tracking device 110. For the sake of clarity one or more descriptions for implementing the transmission of the location information to the reusable device tracking system 114 may aid the reader. For example, the removable and reusable tracking device 110 may include an RFID tag that can transmit the location information to the reusable device tracking system 114 by utilizing radio frequency electromagnetic fields and an RFID reader. Generally, RFID refers to a wireless, non-contacting system for transferring data by way of radio frequency electromagnetic fields. In an RFID system, data transfers occur in the form of modulated signals transmitted between an RFID tag (or an RFID device), which may include various communication components, antennas, logic or circuitry, and an RFID reader, which may include various communication components, antennas, logic, circuitry or other like devices. Data stored within a microchip or other storage device associated with the RFID tag may be sent to the RFID reader, which may interpret not only the data received in the RFID signal but also other relevant information or attributes of the RFID signal, such as an intensity or a frequency of the RFID signal, as well as a direction from which the RFID signal originated, a range traveled by the RFID signal or at least some of the information or data included in the RFID signal. The transfer of the RFID signal is initiated when an electric field or a magnetic field transmitted by an RFID reader is sensed by an RFID tag, which transmits information or data that may be stored in association with the RFID tag in one or more microchips or other storage devices.

RFID systems provide a number of advantages over similar systems for the short-range transfer of information or data. First, an RFID tag may be formed of components having remarkably small, compact shapes and sizes, and tags that are as thin as a sheet of paper or smaller than a grain of rice are quite common. Additionally, unlike a bar code (e.g., a one-dimensional bar code or a two-dimensional "QR" code), an RFID tag need not be provided within a line of sight of an RFID reader in order to successfully transmit data. Therefore, RFID tags may be concealed or embedded into many different types of objects of any size or shape, as well as humans or other animals. Next, an RFID tag may be programmed with a fixed set or packet of "read-only" data which may be transmitted to an RFID reader countless number of times in theory, or reprogrammed with modifiable sets of data that may be written and rewritten, as needed, based on the application in which the RFID tag is provided. Moreover, and perhaps most importantly, while an active RFID tag includes and utilizes a local power source, such as a battery, a passive RFID tag does not require any power in order to successfully transmit a set or packet of data to an RFID reader, and may therefore transmit such data when power supplies are unavailable or in environments where providing power to the RFID tag is infeasible.

RFID signals may be transmitted from an RFID tag to an RFID reader in many different formats and at many different frequency levels. An RFID tag that transmits signals within low frequency (LF), medium frequency (MF) or high frequency (HF) levels (e.g., approximately 3 kilohertz to 30 megahertz, or 3 kHz-30 MHz) may transfer relatively small-sized sets or packets of data over short ranges (e.g., between ten and one hundred centimeters, or 10-100 cm). Other RFID tags may transmit signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

A signal transmission from an RFID tag to an RFID reader may be achieved in any number of ways. An inductively coupled RFID tag is an RFID tag that is powered by energy obtained from magnetic fields generated by an RFID reader, and may be coupled to the RFID reader using this energy. In this regard, an RFID reader may include one or more coils through which an electric current may pass, thereby causing a magnetic field to be generated by the RFID reader according to Ampere's Law. Likewise, an inductively coupled RFID tag may also include one or more coils. When the RFID tag passes within a particular range of the RFID reader, an electric current is generated within the coils of the RFID tag, thereby coupling the RFID reader and the RFID tag based on the magnetic flux passing through the respective sets of coils. The electric current passing through the coils of the RFID tag may then power internal circuits within the RFID tag, and cause an RFID signal to be transmitted from the RFID tag to the RFID reader accordingly. Thus, inductively coupled RFID tags are commonly used in powerless environments where a passive system for transmitting signals may be required.

Additionally, an RFID tag may be coupled by any number of other modes. For example, capacitively coupled RFID tags include coupling plates that are designed to correspond to a plate of an RFID reader. When the RFID tag is placed in sufficiently close proximity to the RFID reader, thereby causing the corresponding coupling plates of the RFID tag and the RFID reader to be aligned in parallel with one another and within a short range, a transfer of data from the RFID tag to the RFID reader is achieved. Unlike an inductively coupled RFID tag, which is powered by a magnetic field generated by an RFID reader, a capacitively coupled RFID tag is powered by an alternating electric field generated by an RFID reader. For this reason, capacitively coupled RFID tags usually have more limited operating ranges than inductively coupled RFID tags and are typically employed in near-field communication environments. Similarly, a backscatter-coupled RFID tag receives power emitted from an RFID reader's antenna. A portion of the emissions from the RFID reader are received by a corresponding antenna of the RFID tag and may be filtered or rectified, as necessary, in order to trigger a transfer of data from the RFID tag to the RFID reader. Any type or mode of coupling between an active, semi-active (e.g., powered on a temporary basis or for limited purposes) or passive RFID tag and an RFID reader may be utilized in accordance with the present description.

In addition to RFID tags which are automatically coupled with an RFID reader, the systems and methods of the present description may further include an RFID tag, such as a passive RFID tag, which may be manually activated, e.g., coupled upon a manual action, by a human or machine in order to cause a transmission of a data signal from the RFID tag to one or more RFID readers. A manually activated RFID tag may include physical or virtual switches that may close a circuit within the RFID tag and thereby permit the RFID tag to function as a data transmitter in the presence of an electric or magnetic field. For example, a manually activated RFID tag may include capacitive elements that define a capacitor within the RFID tag, and may effectively close a circuit within the RFID tag when such elements detect bioelectricity from a user. The term "bioelectricity" generally refers to electrical charges or electric field gradients that may be stored within a living body, such as a human body, which contains blood and other matter having a variety of positively and negatively charged ions (e.g., sodium, chloride and others). Bioelectricity within a body may cause a change in capacitance of such elements in a vicinity of a location touched by the body (e.g., a digit such as a finger or thumb), due to disruptions in electrical fields caused by the body's presence, thereby further causing a change in the time constant of the RFID tag, and a discharge of the capacitor in an amount that may be defined as a function of the resistance of the capacitive elements.

According to some embodiments, such capacitive elements may be formed into a layered stack or may include a substantially linear or planar gap or break, and may be covered with a flexible protective layer formed from one or more plastics or rubbers (e.g., acrylics, vinyls, polyurethanes or the like), or other like materials. The protective layer may be adhered to one or more capacitive elements of an RFID circuit, which may include elements formed from a conductive material such as aluminum, copper, silicon or indium tin oxide that are separated by an air gap. When a user touches a protective layer of an RFID tag with a finger, which is a bioelectric conductor, a change in the effective capacitance (on the order of approximately one picofarad) between the elements, which are also conductors, in a vicinity of a point or points of contact with the protective layer is introduced. Such contact forms a conductive bridge across the elements, thereby causing disruptions in electrical fields in the vicinity of one or more of the elements, and further causing an internal current flow through the RFID tag circuit.

In addition to capacitive elements, a circuit of an RFID tag may include other components for enabling a manual actuation thereof by a human or a machine, including one or more substantially planar conductive elements that may be separated by an air gap. Such an air gap between the conductive elements defines an open switch within the circuit of the RFID tag, which may also be covered with a flexible protective layer that may be formed from one or more plastics, rubbers or other like materials. When a user contacts an external surface of the RFID tag corresponding to the air gap, e.g., the flexible protective layer over the air gap, at least two of the conductive elements are placed in contact with one another, thereby bridging the air gap between the conductive elements and closing the open switch. Subsequently, an internal current flow through the RFID tag circuit is enabled. Because the bridging of the air gap and the closure of the open switch is registered by manually driven electrical contact, a manually activated RFID tag including substantially planar conductive elements does not require bioelectricity in order to operate properly, and a user may interact with the RFID tag using not only his or her fingers or hands (which may be gloved or ungloved) but also a stylus, a pointer or another like object.

Further, workstations situated in the facility may be configured to utilize or are outfitted with RFID readers for communicating with RFID tags that are attached to inventory (tracked item 110 and 112) and transmitting the location information of the RFID tag to the reusable device tracking system 114 as described above. In embodiments, a barcode placed at various locations within the facility, such as at workstation 124, may be read or interacted with by user devices or an image of the bar code captured by cameras situated within the facility. The reusable device tracking system 114 may maintain information that identifies a mapping between each unique barcode and a location within the facility. As an operator 100 interacts with the tracked item (110 and 112), the operator 100 may scan the bar code of a workstation or other location within the facility with the user device 106 and transmit both information from an RFID tag (including a state of the reusable and removal tracking device 110) and the bar code information that can be utilized by the reusable device tracking system 114 to determine the location of the tracked item (110 and 112). In some embodiments, an NFC chip may be associated with the tracked item (110 and 112) and various locations of the facility may be outfitted with NFC readers that also include an NFC chip. As the operator 100 interacts with the tracked item, the NFC chip associated with the tracked item (110 and 112) may be placed within proximity of the NFC readers which can trigger the provisioning of location information in the form of a communication ping. For example, as the NFC chip associated with the tracked item (110 and 112) comes near the NFC reader of the facility, the interaction of the two may trigger the transmittal of location information to the reusable device tracking system 114 in the form of a unique identification (ID). Similarly to the described embodiments that utilize RFID readers, the reusable device tracking system 114 may maintain a mapping that identifies a unique relationship, and thereby location, between the unique ID of the reporting entity (NFC reader chip) and the location of said reader within the facility. The mapping information may be utilized to perform a look up operation that entails determining the unique ID of the reporting entity and the known location of that entity within the facility. In embodiments, particular locations of the facility may be outfitted or configured to utilize wireless and/or wired access points (network access points), wireless routers, and GPS sensors to transmit or determine the location information for a tracked item (110 and 112). For example, the removable and reusable tracking device 110 may be configured with GPS components for transmitting GPS information to the reusable device tracking system 114. The reusable device tracking system 114 can utilize standard techniques for determining the location of the tracked item (110 and 112) based on the GPS information provided by the removable and reusable tracking device 110. Further, network access pings from a network access component associated with the removable and reusable tracking device 110 may be utilized to determine the location of, or transmit the location information to, the reusable device tracking system 114. For example, the network access component may be associated with a unique media access control address (MAC address). As the network access component requests access to, interacts with, or transmits information utilizing the network access points and/or wireless routers, the MAC address and unique identification information associated with the network access points and/or wireless routers may be transmitted to the reusable device tracking system 114. In response, the reusable device tracking system 114 can determine an approximate location of the tracked item (110 and 112) in the facility by utilizing a mapping operation between the reporting entity's unique ID and the MAC address assigned to the network access component as described above with other technological implementations.

In accordance with at least one embodiment, removal information 126 may be provided to the reusable device tracking system 114 upon an operator, such as operator 128 at Workstation C 130, removing the removable and reusable tracking device 110 from the inventory 112. The removal information 126 may be a signal provided by the removable and reusable tracking device 110 directly or the operator 128 can interact with the removable and reusable tracking device 110 with a user device to provide a deactivate signal for the particular device to the reusable device tracking system 114, as described below. In an embodiment, the reusable device tracking system 114 may utilize the removal information 126 to update the state 132 of the particular removable and reusable tracking device 110 in database 120. Updating the state of a removable and reusable tracking device may include switching from an active to idle state or from an idle to active state. An active state removable and reusable tracking device is currently associated with a particular item and cannot be associated with a different item until a deactivate signal or removal information 126 is received by the system 114.

As described herein, the reusable device tracking system 114 may update the state of device 110 to idle and remove any association with the particular tracking device 110 to inventory 112. This allows for an operator, such as operator 128, to reuse the removable and reusable tracking device 110 for inventory processing of a different piece of inventory or item within the facility 104. For example, the operator 128 may attach the now idle tracking device 110 with a different piece of inventory and upon identification information being provided to the reusable device tracking system 114, a new association between device and item may be created and the operator may attach the device 110 to the different inventory. In an embodiment, the reusable device tracking system 114 may record a final location of the tracked item (110 and 112) upon receiving the removal information 126 indicating a last known location of the tracked item within the facility 104 before removal of the removable and reusable tracking device 110 from the inventory 112. In embodiments, the reusable device tracking system may continuously maintain the location history for a particular tracked item or upon disassociation of the device 110 from the inventory 112 delete any location information along with any order mapping and association information.

Figure 2:
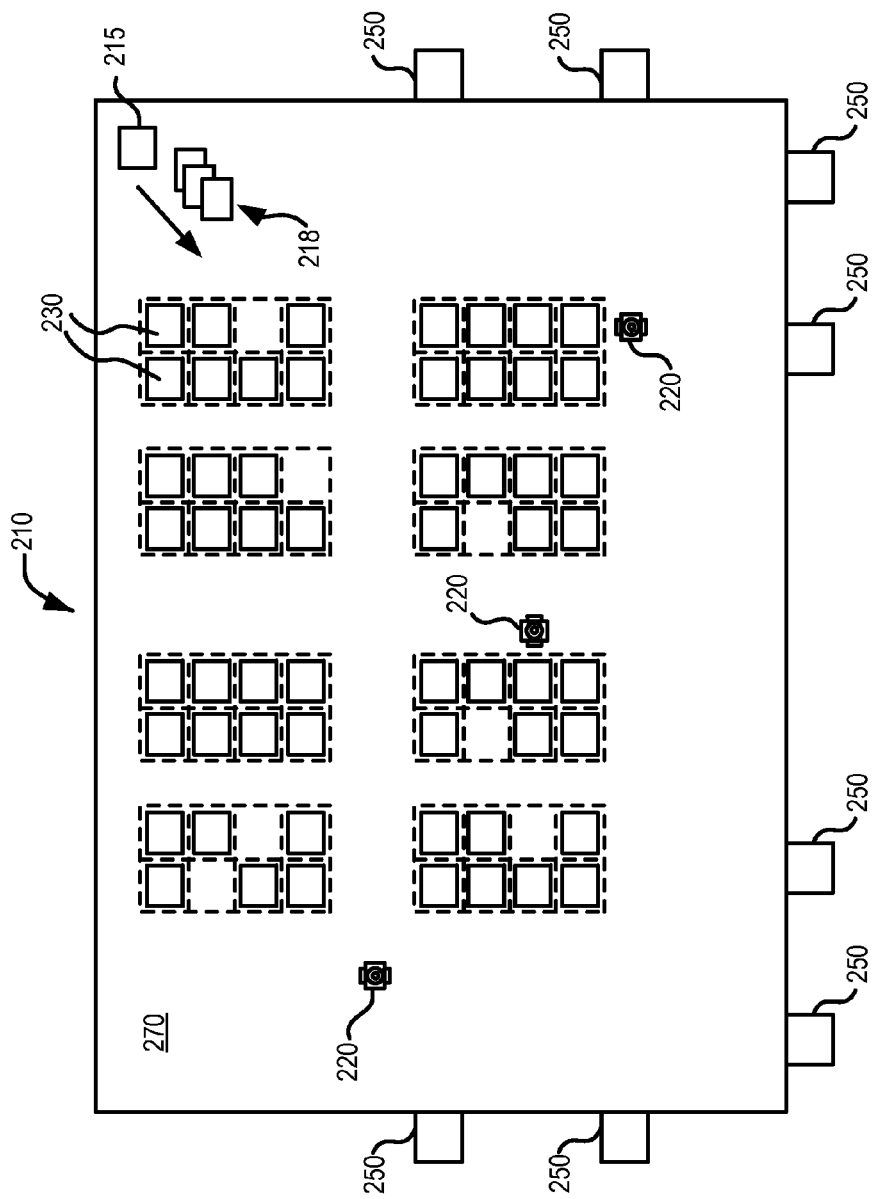
FIG. 2 illustrates components of an inventory management system as described herein, according to embodiments.

FIG. 2 illustrates the components of an inventory management system 210. Inventory management system 210 includes a management module 215, one or more mobile drive units 220, one or more inventory holders 230, and one or more inventory stations 250. Mobile drive units 220 transport inventory holders 230 between points within a workspace 270 in response to commands communicated by management module 215. Each inventory holder 230 stores one or more types of inventory items. As a result, inventory management system 210 is capable of moving inventory items between locations within workspace 270 to facilitate the entry, processing, and/or removal of inventory items from inventory management system 10 and the completion of other tasks involving inventory items.

Management module 215 assigns tasks to appropriate components of inventory management system 210 and coordinates operation of the various components in completing the tasks. These tasks may relate not only to the movement and processing of inventory items, but also to the management and maintenance of the components of inventory management system 210. For example, management module 215 may assign portions of workspace 270 as parking spaces for mobile drive units 220, the scheduled recharge or replacement of mobile drive unit batteries, the storage of empty inventory holders 230, or any other operations associated with the functionality supported by inventory management system 210 and its various components. Management module 215 may select components of inventory management system 210 to perform these tasks and communicate appropriate commands and/or data to the selected components to facilitate completion of these operations. Although shown in FIG. 2 as a single, discrete component, management module 215 may represent multiple components and may represent or include portions of mobile drive units 220 or other elements of inventory management system 210. As a result, any or all of the interaction between a particular mobile drive unit 220 and management module 215 that is described herein may, in particular embodiments, represent peer-to-peer communication between that mobile drive unit 220 and one or more other mobile drive units 220. The components and operation of an example embodiment of management module 215 are discussed further below with respect to FIG. 3.

Mobile drive units 220 move inventory holders 230 between locations within workspace 270. Mobile drive units 220 may represent any devices or components appropriate for use in inventory management system 210 based on the characteristics and configuration of inventory holders 230 and/or other elements of inventory management system 210. In a particular embodiment of inventory management system 210, mobile drive units 220 represent independent, self-powered devices configured to freely move about workspace 270. Examples of such inventory systems are disclosed in U.S. Pat. No. 9,087,314 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 220 represent elements of a tracked inventory management system configured to move inventory holder 230 along tracks, rails, cables, crane system, or other guidance or support elements traversing workspace 270. In such an embodiment, mobile drive units 220 may receive power and/or support through a connection to the guidance elements, such as a powered rail. Additionally, in particular embodiments of inventory management system 210 mobile drive units 220 may be configured to utilize alternative conveyance equipment to move within workspace 270 and/or between separate portions of workspace 270.

Additionally, mobile drive units 220 may be capable of communicating with management module 215 to receive information identifying selected inventory holders 230, transmit the locations of mobile drive units 220, or exchange any other suitable information to be used by management module 215 or mobile drive units 220 during operation. Mobile drive units 220 may communicate with management module 215 wirelessly, using wired connections between mobile drive units 220 and management module 215, and/or in any other appropriate manner. As one example, particular embodiments of mobile drive unit 220 may communicate with management module 215 and/or with one another using 802.11, Bluetooth, or Infrared Data Association (IrDA) standards, or any other appropriate wireless communication protocol. As another example, in a tracked inventory management system 210, tracks or other guidance elements upon which mobile drive units 220 move may be wired to facilitate communication between mobile drive units 220 and other components of inventory management system 210. Furthermore, as noted above, management module 215 may include components of individual mobile drive units 220. Thus, for the purposes of this description and the claims that follow, communication between management module 215 and a particular mobile drive unit 220 may represent communication between components of a particular mobile drive unit 220. In general, mobile drive units 220 may be powered, propelled, and controlled in any manner appropriate based on the configuration and characteristics of inventory management system 210.

Inventory holders 230 store inventory items. In a particular embodiment, inventory holders 230 include multiple storage bins with each storage bin capable of holding one or more types of inventory items. Inventory holders 230 are capable of being carried, rolled, and/or otherwise moved by mobile drive units 220. In particular embodiments, inventory holder 230 may provide additional propulsion to supplement that provided by mobile drive unit 220 when moving inventory holder 230.

Additionally, in particular embodiments, inventory items may also hang from hooks or bars (not shown) within or on inventory holder 230. In general, inventory holder 230 may store inventory items in any appropriate manner within inventory holder 230 and/or on the external surface of inventory holder 230.

Additionally, each inventory holder 230 may include a plurality of faces, and each bin may be accessible through one or more faces of the inventory holder 230. For example, in a particular embodiment, inventory holder 230 includes four faces. In such an embodiment, bins located at a corner of two faces may be accessible through either of those two faces, while each of the other bins is accessible through an opening in one of the four faces. Mobile drive unit 220 may be configured to rotate inventory holder 230 at appropriate times to present a particular face and the bins associated with that face to an operator or other components of inventory management system 210.

Inventory items represent any objects suitable for storage, retrieval, and/or processing in an automated inventory management system 210. For the purposes of this description, "inventory items" may represent any one or more objects of a particular type that are stored in inventory management system 210. Thus, a particular inventory holder 230 is currently "storing" a particular inventory item if the inventory holder 230 currently holds one or more units of that type. As one example, inventory management system 210 may represent a mail order warehouse facility, and inventory items may represent merchandise stored in the warehouse facility. During operation, mobile drive units 220 may retrieve inventory holders 230 containing one or more inventory items requested in an order to be packed for delivery to a customer or inventory holders 230 carrying pallets containing aggregated collections of inventory items for shipment. Moreover, in particular embodiments of inventory management system 210, boxes containing completed orders may themselves represent inventory items.

In particular embodiments, inventory management system 210 may also include one or more inventory stations 250 (e.g., inventory transfer stations). Inventory stations 250 represent locations designated for the completion of particular tasks involving inventory items. Such tasks may include the removal of inventory items from inventory holders 230, the introduction of inventory items into inventory holders 230, the counting of inventory items in inventory holders 230, the decomposition of inventory items (e.g. from pallet- or case-sized groups to individual inventory items), the consolidation of inventory items between inventory holders 230, and/or the processing or handling of inventory items in any other suitable manner. In particular embodiments, inventory stations 250 may just represent the physical locations where a particular task involving inventory items can be completed within workspace 270. In alternative embodiments, inventory stations 250 may represent both the physical location and also any appropriate equipment for processing or handling inventory items, such as scanners for monitoring the flow of inventory items in and out of inventory management system 210, communication interfaces for communicating with management module 215, and/or any other suitable components. Inventory stations 250 may be controlled, entirely or in part, by human operators or may be fully automated. Moreover, the human or automated operators of inventory stations 250 may be capable of performing certain tasks to inventory items, such as packing, counting, or transferring inventory items, as part of the operation of inventory management system 210.

Workspace 270 represents an area associated with inventory management system 210 in which mobile drive units 220 can move and/or inventory holders 230 can be stored. For example, workspace 270 may represent all or part of the floor of a mail-order warehouse in which inventory management system 210 operates. Although FIG. 2 shows, for the purposes of illustration, an embodiment of inventory management system 210 in which workspace 270 includes a fixed, predetermined, and finite physical space, particular embodiments of inventory management system 210 may include mobile drive units 220 and inventory holders 230 that are configured to operate within a workspace 270 that is of variable dimensions and/or an arbitrary geometry. While FIG. 2 illustrates a particular embodiment of inventory management system 210 in which workspace 270 is entirely enclosed in a building, alternative embodiments may utilize workspaces 270 in which some or all of the workspace 270 is located outdoors, within a vehicle (such as a cargo ship), or otherwise unconstrained by any fixed structure.

In operation, management module 215 selects appropriate components to complete particular tasks and transmits task assignments 218 to the selected components to trigger completion of the relevant tasks. Each task assignment 218 defines one or more tasks to be completed by a particular component. These tasks may relate to the retrieval, storage, replenishment, and counting of inventory items and/or the management of mobile drive units 220, inventory holders 230, inventory stations 250 and other components of inventory management system 210. Depending on the component and the task to be completed, a particular task assignment 218 may identify locations, components, and/or actions associated with the corresponding task and/or any other appropriate information to be used by the relevant component in completing the assigned task.

In particular embodiments, management module 215 generates task assignments 218 based, in part, on inventory requests that management module 215 receives from other components of inventory management system 210 and/or from external components in communication with management module 215. These inventory requests identify particular operations to be completed involving inventory items stored or to be stored within inventory management system 210 and may represent communication of any suitable form. For example, in particular embodiments, an inventory request may represent a shipping order specifying particular inventory items that have been purchased by a customer and that are to be retrieved from inventory management system 210 for shipment to the customer. Management module 215 may also generate task assignments 218 independently of such inventory requests, as part of the overall management and maintenance of inventory management system 210. For example, management module 215 may generate task assignments 218 in response to the occurrence of a particular event (e.g., in response to a mobile drive unit 220 requesting a space to park), according to a predetermined schedule (e.g., as part of a daily start-up routine), or at any appropriate time based on the configuration and characteristics of inventory management system 210. After generating one or more task assignments 218, management module 215 transmits the generated task assignments 218 to appropriate components for completion of the corresponding task. The relevant components then execute their assigned tasks.

With respect to mobile drive units 220 specifically, management module 215 may, in particular embodiments, communicate task assignments 218 to selected mobile drive units 220 that identify one or more destinations for the selected mobile drive units 220. Management module 215 may select a mobile drive unit 220 to assign the relevant task based on the location or state of the selected mobile drive unit 220, an indication that the selected mobile drive unit 220 has completed a previously-assigned task, a predetermined schedule, and/or any other suitable consideration. These destinations may be associated with an inventory request the management module 215 is executing or a management objective the management module 215 is attempting to fulfill. For example, the task assignment may define the location of an inventory holder 230 to be retrieved, an inventory station 250 to be visited, a storage location where the mobile drive unit 220 should park until receiving another task, or a location associated with any other task appropriate based on the configuration, characteristics, and/or state of inventory management system 210, as a whole, or individual components of inventory management system 210. For example, in particular embodiments, such decisions may be based on the popularity of particular inventory items, the staffing of a particular inventory station 250, the tasks currently assigned to a particular mobile drive unit 220, and/or any other appropriate considerations.

As part of completing these tasks mobile drive units 220 may dock with and transport inventory holders 230 within workspace 270. Mobile drive units 220 may dock with inventory holders 230 by connecting to, lifting, and/or otherwise interacting with inventory holders 230 in any other suitable manner so that, when docked, mobile drive units 220 are coupled to and/or support inventory holders 230 and can move inventory holders 230 within workspace 270. While the description herein focuses on particular embodiments of mobile drive unit 220 and inventory holder 230 that are configured to dock in a particular manner, alternative embodiments of mobile drive unit 220 and inventory holder 230 may be configured to dock in any manner suitable to allow mobile drive unit 220 to move inventory holder 230 within workspace 270. Additionally, as noted herein, in particular embodiments, mobile drive units 220 represent all or portions of inventory holders 230. In such embodiments, mobile drive units 220 may not dock with inventory holders 230 before transporting inventory holders 230 and/or mobile drive units 220 may each remain continually docked with a particular inventory holder 230.

While the appropriate components of inventory management system 210 complete assigned tasks, management module 215 may interact with the relevant components to ensure the efficient use of space, equipment, manpower, and other resources available to inventory management system 210. As one specific example of such interaction, management module 215 is responsible, in particular embodiments, for planning the paths mobile drive units 220 take when moving within workspace 270 and for allocating use of a particular portion of workspace 270 to a particular mobile drive unit 220 for purposes of completing an assigned task. In such embodiments, mobile drive units 220 may, in response to being assigned a task, request a path to a particular destination associated with the task. Moreover, while the description herein focuses on one or more embodiments in which mobile drive unit 220 requests paths from management module 215, mobile drive unit 220 may, in alternative embodiments, generate its own paths.

Components of inventory management system 210, such as access points that provide wireless communication, may provide information to management module 215 regarding their current state, other components of inventory management system 210 with which they are interacting, and/or other conditions relevant to the operation of inventory management system 210. This may allow management module 215 to utilize feedback from the relevant components to update algorithm parameters, adjust policies, or otherwise modify its decision-making to respond to changes in operating conditions or the occurrence of particular events.

In addition, while management module 215 may be configured to manage various aspects of the operation of the components of inventory management system 210, in particular embodiments, the components themselves may also be responsible for decision-making relating to certain aspects of their operation, thereby reducing the processing load on management module 215.

Thus, based on its knowledge of the location, current state, and/or other characteristics of the various components of inventory management system 210 and an awareness of all the tasks currently being completed, management module 215 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory management system 210 may be able to support a number of techniques for efficiently executing various aspects of the operation of inventory management system 210. As a result, particular embodiments of management module 215 may, by implementing one or more management techniques described herein, enhance the efficiency of inventory management system 210 and/or provide other operational benefits.

Figure 3:
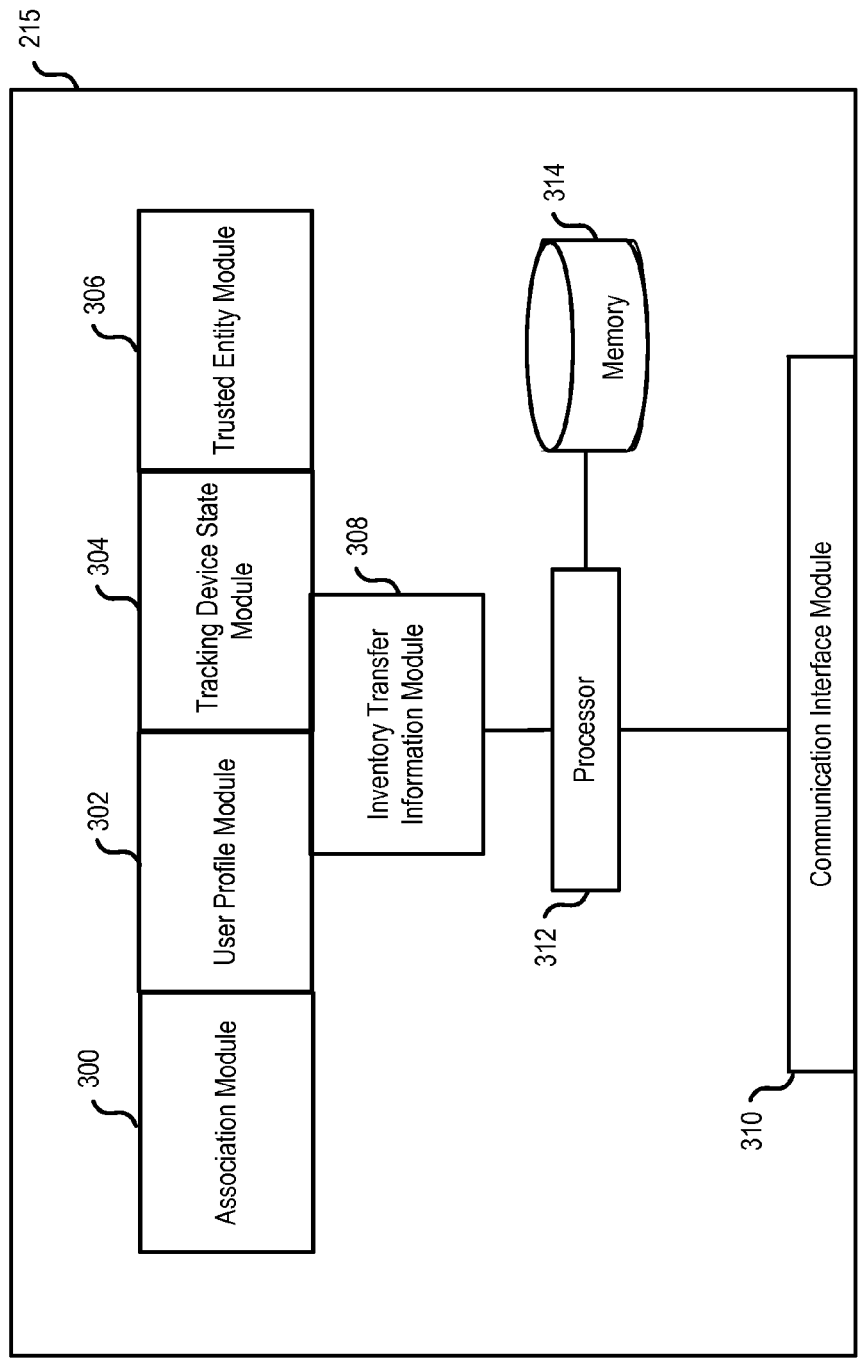
FIG. 3 illustrates in greater detail the components of an example management module that may be utilized in particular embodiments of the inventory management system that implements a reusable tracking device feature as described herein, according to embodiments.

FIG. 3 illustrates in greater detail the components of an example management module that may be utilized in particular embodiments of the inventory management system that implements a reusable tracking device feature as described herein, according to embodiments. As shown, the example embodiment includes an association module 300, a user profile module 302, a tracking device state module 304, a trusted entity module 306, an inventory transfer information module 308, a communication interface module 310, a processor 312, and memory 314. Management module 215 may represent a single component, multiple components located at a central location within inventory management system 210, or multiple components distributed throughout inventory management system 210. For example, management module 215 may represent components including one or more mobile drive units 220 that are capable of communicating information between the mobile drive units 220 and coordinate the movement of mobile drive units 220 within workspace 270 or components of inventory transfer stations that are capable of communicating information between removable and reusable tracking devices and inventory at different locations within the workspace 270. In general, management module 215 may include any appropriate combination of hardware and/or software suitable to provide the described functionality.

Processor 312 is operable to execute instructions associated with the functionality provided by management module 215. Processor 312 may comprise one or more general purpose computers, dedicated microprocessors, or other processing devices capable of communicating electronic information. Examples of processor 312 include one or more application-specific integrated circuits (ASICs), field programmable gate arrays (FPGAs), digital signal processors (DSPs), and any other suitable specific or general purpose processors.

Memory 314 stores processor instructions, inventory transfer requests, reservation information, state information for the various components of inventory management system 210 and/or any other appropriate values, parameters, or information utilized by management module 215 during operation such as associations between removable and reusable tracking devices and inventory or relative locations of tracked items within the workspace 270. Memory 314 may represent any collection and arrangement of volatile or nonvolatile, local or remote devices suitable for storing data. Examples of memory 314 include, but are not limited to, random access memory (RAM) devices, read only memory (ROM) devices, magnetic storage devices, optical storage devices, or any other suitable data storage devices.

Association module 300 may be configured to maintain associations between particular removable and reusable tracking devices and particular items. As described herein, the association module 300 may generate an association between a particular removable and reusable tracking device and a particular item based on identification information received from both the device and the item and an indication or signal that the tracking device has been attached to the particular item. In embodiments, the association module 300 may generate a one to one association between a particular removable and reusable tracking device and a particular item or a one to many association between the particular removable and reusable tracking device and one or more items, e.g., placed together in a bag, tote, basket, container, etc. The association module 300 may be configured to disassociate any generated associations between the reusable tracking device and the particular item based on receiving a disassociating signal from an operator at a workstation in the inventory management system, from a user utilizing a user device such as an application configured to run on said user device, or from the reusable tracking device itself upon being removed from the particular item, described below. In an embodiment, the association module 300 may dynamically update the associations for a particular removable and reusable tracking device of a plurality of removable and reusable tracking devices based on information received from an operator, from a user, or from the device itself.

The user profile module 302 may be configured to maintain information about a user. In embodiments, the information about the user may include a location of the user, shipping information for the user, billing information for the user, shopping history associated with the user in an electronic marketplace or other online retailer/retailer, preferences of the user including a selection of automatically re-order items or a preference to be notified first before a re-order is instructed, and time period information indicating how long before re-orders are placed for particular items that are delivered to the user. The user profile module 302 may dynamically update the information about the user based on observed behavior with the removable and reusable tracking device features described herein. In an embodiment, the user profile information may be updated via a network document generated and provided by the management module 215 via one or more networks to a user device of the user.

The tracking device state module 304 may be configured to maintain state (active/idle) information for a plurality of removable and reusable tracking devices within the inventory management system or located outside of the inventory management system (such as devices that are attached to orders for items that are being delivered to a user's location). In an embodiment, the tracking device state module 304 may update or change the state associated with a particular removable and reusable tracking device based on signals or information received from the device itself, as described below, the workspace, an operator, or a user utilizing a user device (such as via an application configured to run on the user device). In embodiments, the tracking device state module 304 may be configured to determine a location of the tracked item within the inventory management system. As described herein, the tracking device state module 304 may utilize location information provided by the removable and reusable tracking device, a particular workstation, an operator interacting with the tracking device utilizing a user device, or a particular access point within the inventory management system.

The tracking device state module 304 may utilize the location information and perform a mapping or determination based on identification information provided by the communicating entity (for example an identification for a particular workstation that provides the location information or a particular removable and reusable tracking device) and information about the workspace or inventory management system in which the tracked item is currently located. For example, the tracking device state module 304 may maintain and update a blueprint or digital map that indicates precise locations of access points, workstations, layouts, and operators as well as their associated identifiers to determine a location of the tracked item by mapping the location information which can include the ID of a particular tracking device and an ID of the reporting entity (workstation, operator, etc.,). In an embodiment, the removable and reusable tracking devices may be configured to utilize one or more inputs and outputs. For example, a reusable tracking device may include visual indicators such as light-emitting diode (LED) lights or digital screens, audio indicators such as speakers or musical instrument digital interface (MIDI) devices, vibrating elements that allow the tracking device to vibrate upon receiving a signal from the management module 215 via one or more vibrating motors, thermometers, moisture detectors, light detectors, and pressure detectors. Signals or data can be provided by the tracking device state module 304 to a particular removable and reusable tracking device via one or more networks (wireless, Bluetooth, NFC, etc.) to provide sensory feedback or further instructions to any user or operator near the tracked item. As discussed below in FIG. 4 this can aid an operator or user in locating a tracked item that has been lost (such as by emitting an alarm sound based on receiving a signal from the management module 215 via the attached speakers).

The trusted entity module 306 may maintain associations or relationships between a user and a trusted entity for a removable and reusable tracking device feature described herein. The trusted entity module 306 may maintain and update contact information for the trusted entities as well as contact preferences of the trusted entities for re-order or resupply notifications. The trusted entity module 306 may maintain verification information for each trusted entity such as passwords, security questions, generated hashes, encryption keys, or any suitable security information associated with a user-trusted entity relationship. The trusted entity module 306, the inventory transfer information module 308, and the communication interface module 310 may be configured to generate and provide one or more notifications to a trusted entity on behalf of a user that includes information enabling the trusted entity to authorize a re-order or resupply of a previously placed order on behalf of the user as described herein. As used herein a trusted entity includes another user or person associated with the reusable and removable device tracking system. For example, a trusted entity could include the user's mother, father, brother/sister, best friend, etc. In some examples, a trusted entity relationship could be formed between an employee and workplace as part of a benefits package that approves the re-order and/or resupply of items that the employee has previously ordered.

The inventory transfer information module 308 may be configured to map the association or disassociation between an item and a reusable and removable tracking device to an inventory transfer request. In an embodiment, the inventory transfer information module 308 may maintain one or more parameters or metrics associated with each inventory transfer request based on the one or more items included in the inventory transfer request. For example, the inventory transfer information module 308 may maintain a number of acceptable parameters for an order of tortilla chips such as an acceptable temperature range, moisture range, pressure range, and shelf-life range. The inventory transfer information module 308 may determine whether a tracked item is currently located in an appropriate location within the inventory management system based on the location determined by the tracking device state module 304 and inventory transfer request information.

For example, a particular inventory transfer request may indicate quick delivery that can only be processed within certain locations of the inventory management system. If the inventory transfer information module 308 determines that the current location of the tracked item is not within the proper processing area to meet the delivery requirements, the module 308 may provide feedback via the one or more outputs attached to the removable and reusable tracking device as described herein. In an embodiment, the inventory transfer information module 308 may determine whether acceptable ranges are appropriate for the particular tracked item based on output provided by the tracked item via the removable and reusable tracking device and the maintained parameters or metrics for the tracked item. If the conditions are inappropriate for the tracked item, instructions or data can be provided to the particular removable and reusable tracking device to aid operators or users in rectifying the situation based on the particular parameter that is being violated. In an embodiment, the inventory transfer information module 308 determines a specific time period or time range to re-order the item associated with the removable and reusable tracking device based on a removal or detach signal received from the tracking device, parameters associated with the item, and user preferences. It should be understood that based on the above factors in determining an appropriate time period for re-ordering an item on behalf of a user that a particular item may have one time period determined for a particular user that can be different based on the above factors from user to user and item to item. Upon expiration of the determined time period for a tracked item, the inventory transfer information module 308 may generate and provide instructions to re-order the particular item on behalf of the user. A notification indicating that a re-order may be placed can be provided to the user directly or to an online retailer or other retailer on behalf of the user based on user preferences. The user may opt-in for automatic re-order or may wish to receive a notification enabling the user to authorize the re-order transaction.

Figure 4:
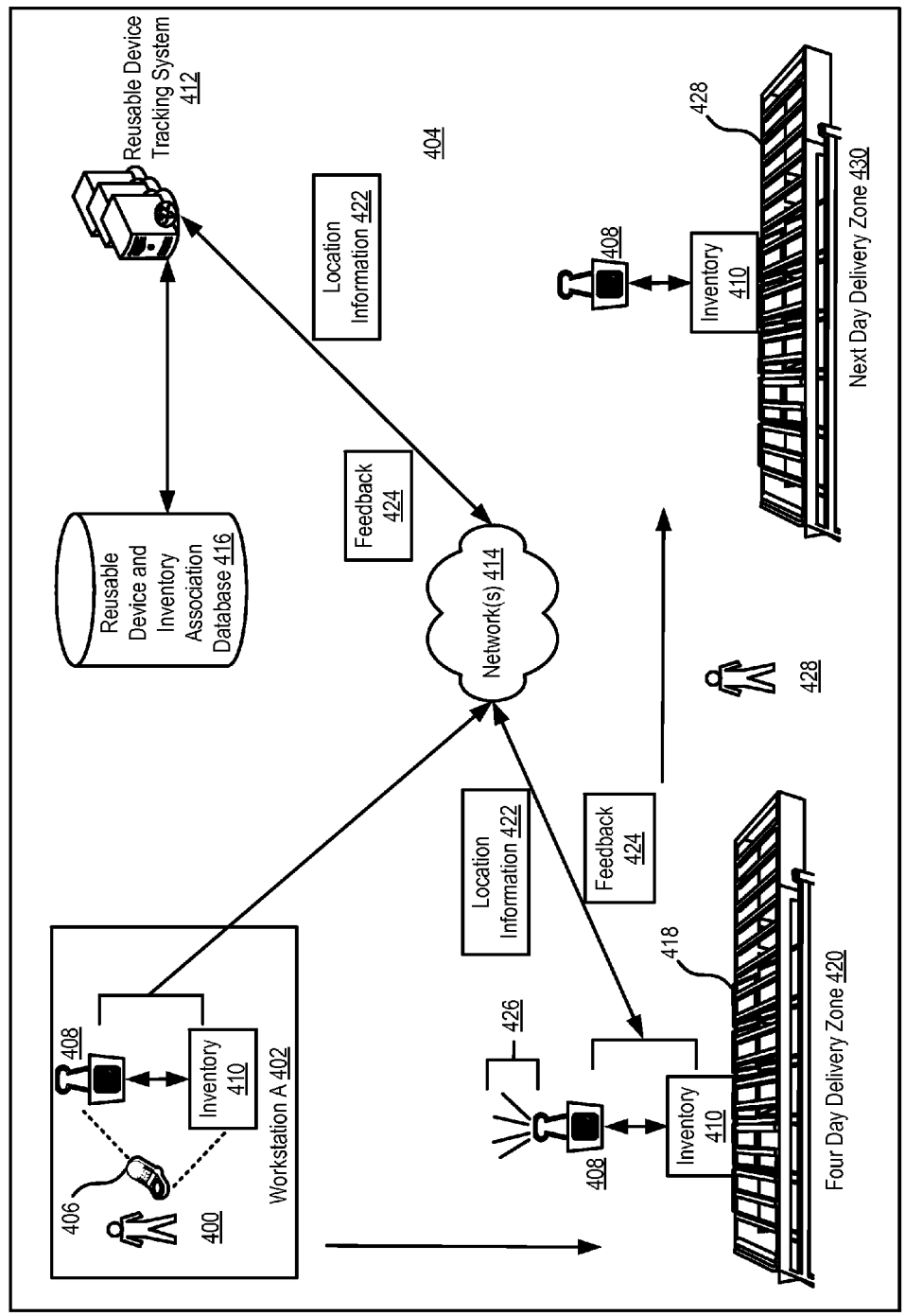
FIG. 4 illustrates an example data flow for a signal feedback feature that can be utilized within the inventory management system as described herein, according to embodiments.

FIG. 4 illustrates an example data flow for a signal feedback feature that can be utilized within the inventory management system as described herein, according to embodiments. FIG. 4 includes an operator 400 processing inventory at Workstation A 402 within a facility 404. The operator 400 may, as described herein, utilize a user device 406 to provide identification information for a removable and reusable tracking device 408 and inventory 410 to a reusable device tracking system 412 via one or more available networks 414 within the facility 404. As described herein, the reusable device tracking system 412 may implement the management module 215 and the providing or communication of information to different components of the inventory management system may include utilizing one or more access points (not pictured) that interact with the available networks 414. In embodiments, the operator 400 may physically attach (represented in FIG. 4 by the double sided arrow between 408 and 410) the removable and reusable tracking device 408 (such as an RFID tag) to inventory 410 which can result in a signal being provided to the reusable device tracking system 412 via networks 414 to thereby create a tracked item and associate the device 408 with inventory 410. The reusable device tracking system 412 may maintain such associations between one or more removable and reusable tracking devices and inventory in a database such as database 416.

The reusable device tracking system 412 may map the association of the removable and reusable tracking device 408 and inventory 410 to an inventory transfer request associated with the inventory. In an embodiment, the reusable device tracking system 412 may maintain one or more parameters, metrics, or information about the inventory transfer request such as appropriate environment conditions for the inventory 410 (temperature, pressure, moisture, light sensitivity, etc.,) and determine the relative location of the tracked item (408 and 410) within the facility 404 based on received location information. FIG. 4 illustrates the operator 400 transferring the tracked item (408 and 410) to a different inventory processing area within the facility 404 such as an inventory rack 418 for a four day delivery zone 420. In an embodiment, as part of transferring the tracked item (408 and 410) to the inventory rack 418 the operator 400 may interact, via the user device 406, with the tracked item (408 and 410) to provide location information 422 to the reusable device tracking system 412 via the networks 414.

As described herein, location information 422 can include global positioning system (GPS) signals or other information that indicates a location based on a mapped association between the location information provider (workstation, operator, user device, access point, etc.,) and a layout of the facility 404. The reusable device tracking system 412 can utilize the provided location information 422 to determine the relative location of the tracked item (408 and 410) within the facility 404. In an embodiment, the reusable device tracking system 412 can analyze the determined location and further determine whether the tracked item (408 and 410) is currently in a correct location within the facility for inventory processing or determine if other parameters or metrics are inappropriate (outside of acceptable ranges for one or more parameters) for the tracked item (408 and 410) based on information that may be included with the location information (temperature, moisture, pressure, etc.,). FIG. 4 illustrates that the reusable device tracking system 412 has determined that the tracked item (408 and 410) is currently in a location for processing inventory that will be delivered within four days when the inventory transfer request mapped to the tracked item (408 and 410) should be processed in an area of the facility for next day delivery. As such, the reusable device tracking system 412 can provide feedback data or signals 424 directly to the removable and reusable tracking device 408 which can instruct the device 408 to provide feedback. In FIG. 4 the feedback includes audio feedback (426) that a nearby operator 428 can hear and can lead to the operator inspecting the tracked item (408 and 410) for an appropriate location or inventory processing.

In an embodiment, the removable and reusable tracking device 408 may be outfitted or configured to utilize one or more environmental or sensory outputs and inputs as described herein. The feedback data or signals 424 may thus include information which, in the cause of auditory outputs, includes a series of sounds such as beeps or language instructions for any nearby operator to follow to rectify the inappropriate location situation (such as by providing instructions in English to move the tracked item (408 and 410) to the next day delivery rack). Other feedback data or signals 424 may be appropriate given the particular one or more environmental or sensory outputs and inputs associated with the removable and reusable tracking device 408 such as providing instructions indicating the problem with the tracked item (408 and 410) via a display screen, a series of lights, or vibrations. In an embodiment, the management module 215 and the reusable device tracking system 412 may maintain a series of sounds, light pulses, or vibrations that are unique and each indicate a different problem (a particular number or sequence of beeps for a location error, a particular number or sequence of blinking lights to indicate an inappropriate temperature range, etc.). As such, FIG. 4 illustrates an operator 428 hearing the audio feedback 426 from the tracked item (408 and 410), determining that the inventory transfer request associated with the tracked item (408 and 410) should be processed in a different area of the facility 404, and moving the tracked item (408 and 410) to the appropriate area (a different inventory rack 428 for a next day delivery zone 430). In an embodiment, the reusable device tracking system 412 can continue to dynamically determine the appropriate location of the tracked item (408 and 410) and provide feedback 424 until the updated determined location is appropriate or an operator (428) can interact with the removable and reusable tracking device 408, via a button, to cease feedback operations for a short period.

Figure 5:
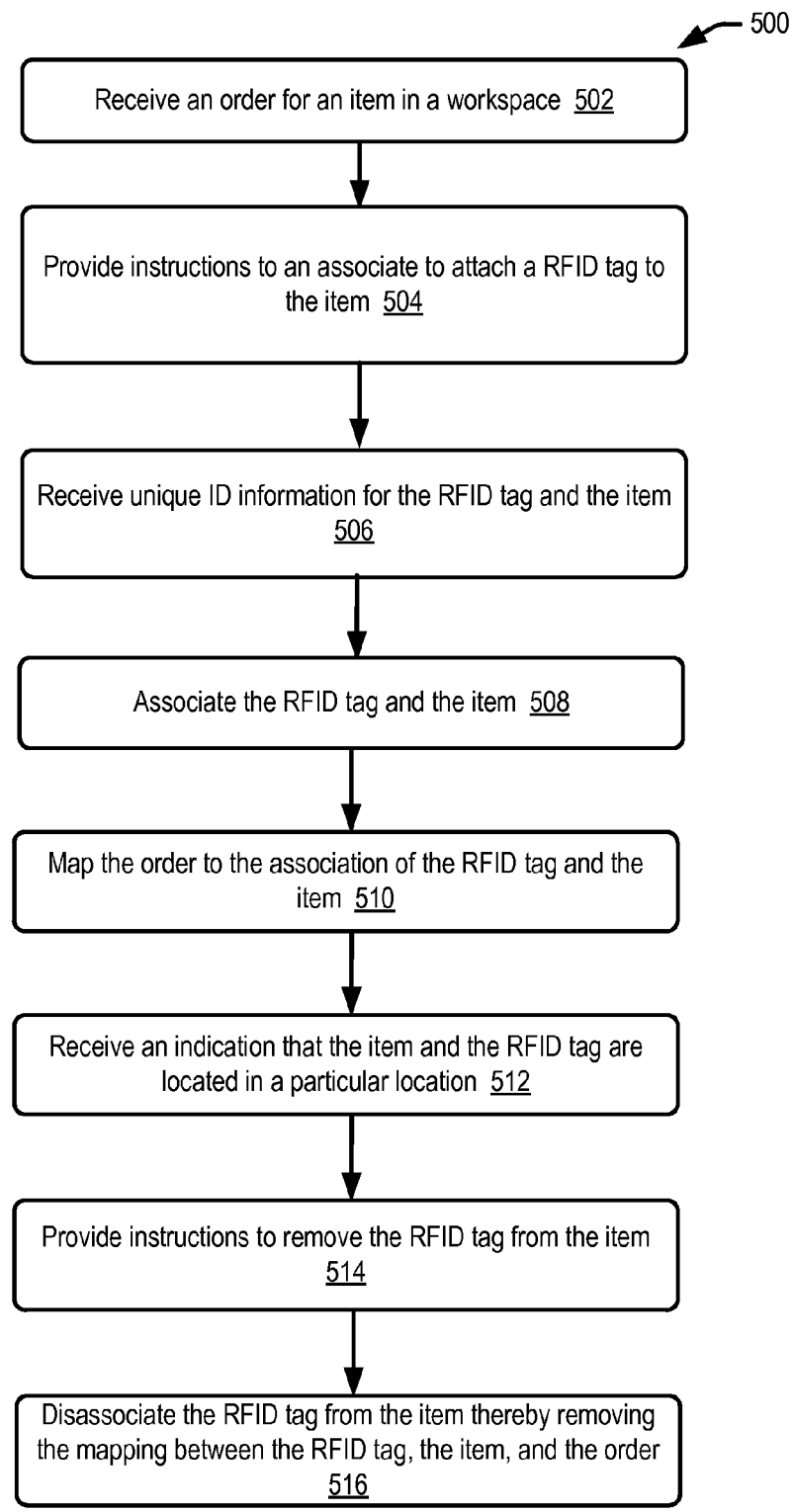
FIG. 5 illustrates a flow diagram depicting example acts for implementing techniques relating to tracking inventory in an inventory management system as described herein, according to embodiments.

FIG. 5 illustrates a flow diagram depicting example acts for implementing techniques relating to tracking inventory in an inventory management system as described herein, according to embodiments. The management module 215 (FIGS. 2 and 3) may perform the process 500 of FIG. 5. The process 500 begins at 502 by receiving an order for an item in a workspace. For example, a user may have ordered a particular item from an electronic marketplace that processes such orders in the workspace. The process 500 may include providing instructions to an associate or operator to attach an RFID tag to the item at 504. For example, the operator may physically attach an idle RFID tag to the item at a workstation, inventory transfer station, or any portion of the inventory management system as part of inventory processing. The process 500 may include receiving unique identification information for the RFID tag and the item at 506. In an embodiment, the operator may interact with the RFID tag and the item with a barcode or machine readable identifier scanner and/or RFID reader to provide the identification information from the RFID tag and the item to the management module 215. The process 500 may include associating the RFID tag and the item at 508. In embodiments, the management module 215 may maintain one or more associations of RFID tags to one or more items within the workspace or inventory management system.

The process 500 may include mapping the order for the item to the association of the RFID tag and the item at 510. In an embodiment, the management module 215 may perform the mapping of an order or inventory transfer request to an association of a particular RFID tag and a particular item within the inventory management system. The process 500 may include receiving an indication that the item and the RFID tag are located in a particular location within the workspace at 512. As described herein, the RFID tag and one or more other components of the inventory management system may provide location information that can be utilized by the management module 215 to determine the relative location of the tracked item. In an embodiment, upon determining that the tracked item has arrived at a particular location within the workspace, instructions may be provided via the RFID tag and its associated outputs (speakers, LED screen, visual indicators, etc.) to remove the RFID tag from the item for further processing of the item within the workspace. The process 500 may include providing instructions to remove the RFID tag from the item at 514. The process 500 may conclude at 516 by disassociating the RFID tag from the item thereby removing the mapping between the RFID tag, the item, and the order. Once the association between the RFID tag and the item has been removed the RFID tag may be considered idle and ready to be associated with a new item as part of a new order or inventory transfer request within the workspace.

Figure 6:
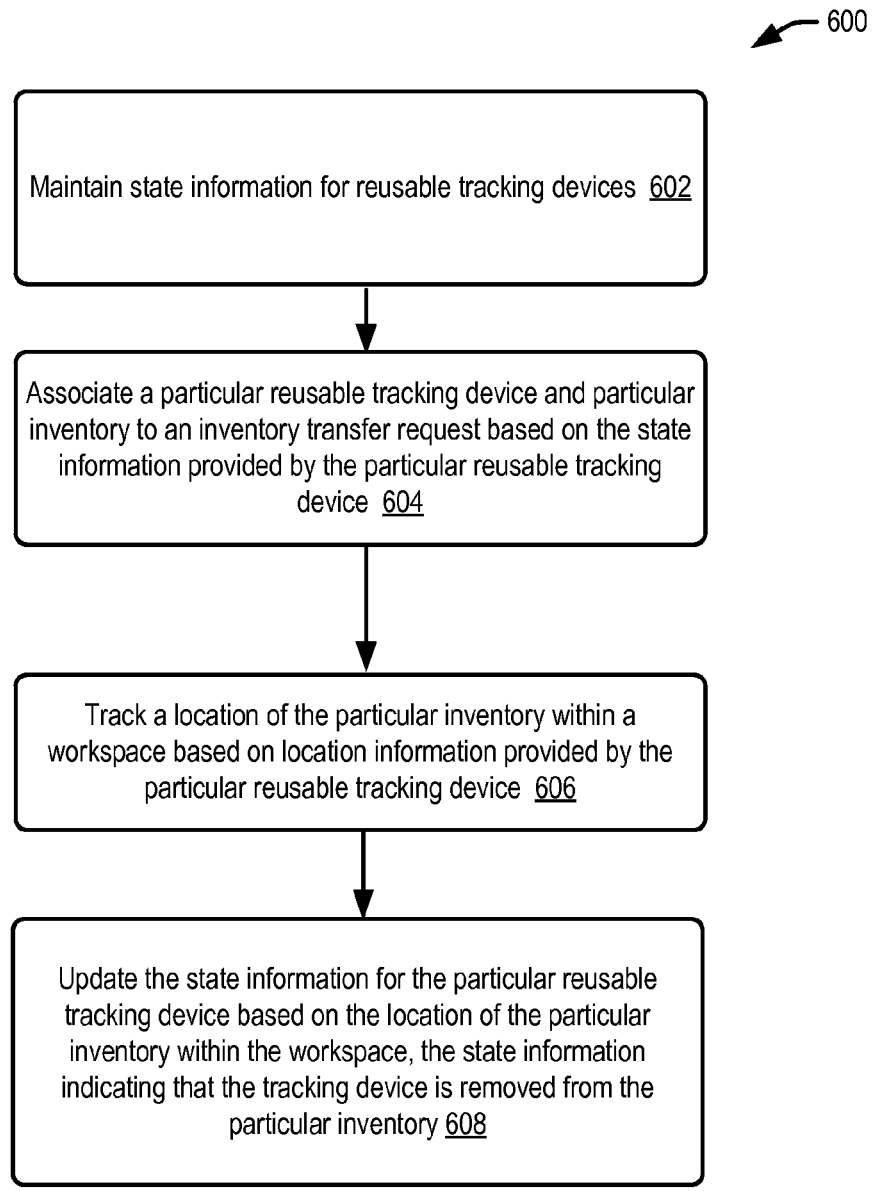
FIG. 6 illustrates a flow diagram depicting example acts for implementing techniques relating to tracking inventory in an inventory management system as described herein, according to embodiments.

FIG. 6 illustrates a flow diagram depicting example acts for implementing techniques relating to tracking inventory in an inventory management system as described herein, according to embodiments. The management module 215 (FIGS. 2 and 3) may perform the process 600 of FIG. 6. The process 600 may begin at 602 by maintaining state information for reusable tracking devices. In an embodiment, the management module 215 may maintain state information for a plurality of reusable tracking devices within an inventory management system. The process 600 may include associating a particular reusable tracking device and particular inventory to an inventory transfer request based on the state information provided by the particular reusable tracking device at 604. For example, the management module 215 may receive an indication or signal from the particular reusable tracking device indicating that an attachment to an item has occurred which may trigger the module 215 associating the device to the item and mapping the association to the inventory transfer request. The process 600 may include tracking a location of the particular inventory within a workspace based on location information provided by the particular reusable tracking device at 606. In an embodiment, the management module 215 may determine a location of the tracked item based on information, such as GPS signals provided by the removable and reusable tracking device, and a digital map or layout of the workspace. The location of the tracked item can be dynamically updated based on newly received location information from the tracked item or other components of the workspace (workstations, operators, scanners or readers, cameras, etc.,) within the workspace. The process 600 may conclude at 608 by updating the state information for the particular reusable tracking device based on the location of the particular inventory within the workspace. In an embodiment, the updated state information may indicate that the reusable tracking device is removed from the particular inventory.

Figure 7:
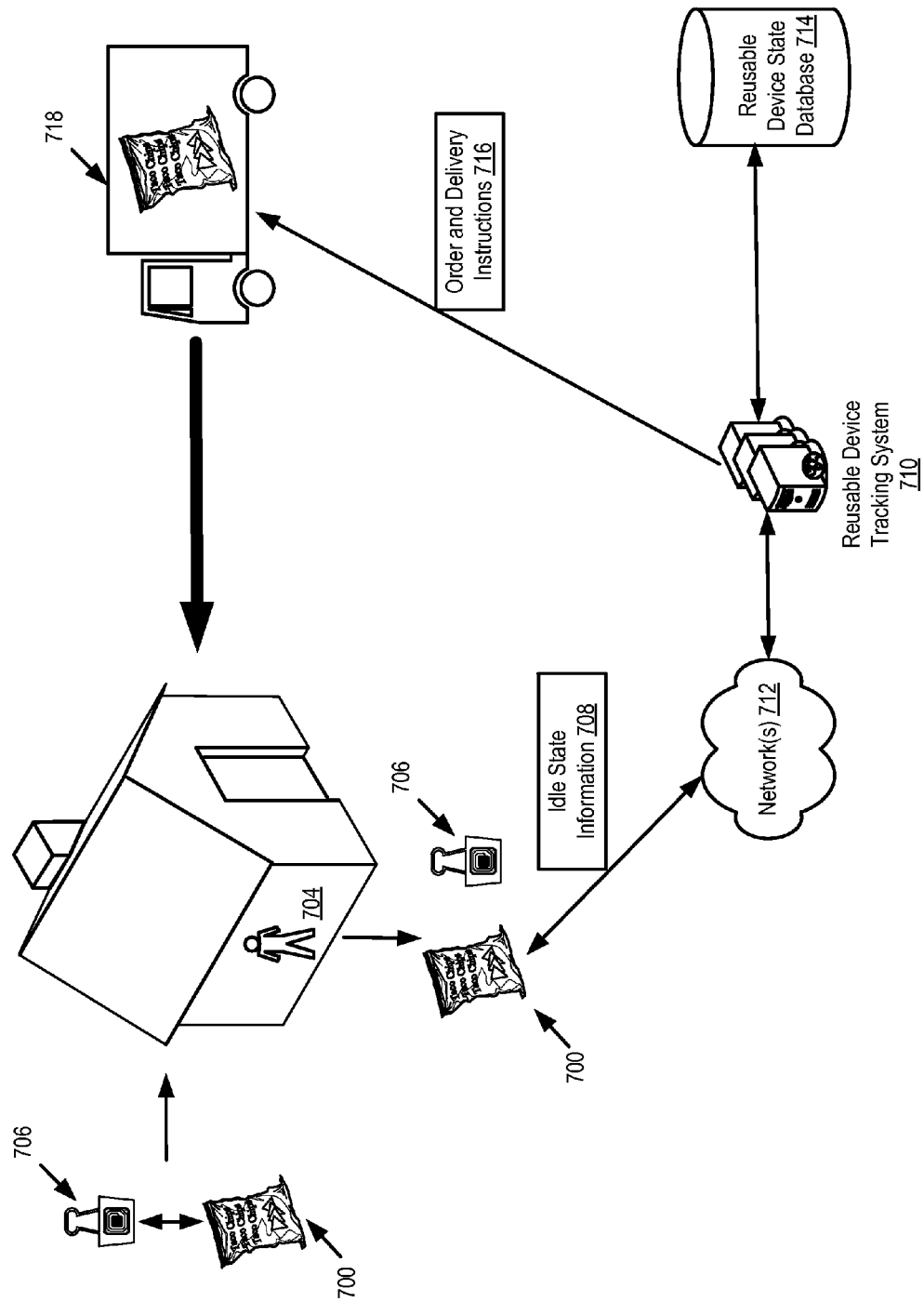
FIG. 7 illustrates an example data flow for a reusable tracking device feature as described herein, according to embodiments.

FIG. 7 illustrates an example data flow for a reusable tracking device feature as described herein, according to embodiments. FIG. 7 includes an item 700 (taco chips) being provided to a user 704 with a removable and reusable tracking device 706 physically attached (represented in FIG. 7 by the double sided arrow between 700 and 706) to the item 700. As described herein, the user 704 may physically remove the removable and reusable tracking device 706 from the item 700, perhaps upon consuming or interacting with the item 700. The removal of the removable and reusable tracking device 706 from the item 700 may trigger the device 706 providing state information 708 to a reusable device tracking system 710 via one or more available networks 712. In an embodiment, the removable and reusable tracking device 706 while attached to the item 700 may transmit active state information or be considered to be in an active state based on one or more contact sensors that are associated with the device 706 being interrupted. Upon the user 704 removing the removable and reusable tracking device 706 from the item 700, the one or more contact sensors may be contacted or no longer interrupted which may trigger the provision of the state information 708 to the reusable device tracking system 710. In some examples, the removable and reusable tracking device 706 may include at least two contact sensors that trigger the determination and provision of state information 708. For example, when the two contact sensors are not interrupted, the state information 708 may identify that the removable and reusable tracking device 706 is currently idle and therefore not attached to the item 700. When the two contact sensors are interrupted, the state information 708 may identify that the removable and reusable tracking device 706 is active and therefore attached to the item 700. Such binary information can be stored and transmitted in a similar fashion and with similar technological implementations as those discussed above with reference to transmitting location information. In an example, the removable and reusable tracking device 706 may include one contact sensor that triggers the determination and provision of state information 708. For example, when the contact sensor is not in contact with any surface, including the surface of an item 700, the state information 708 may indicate that the removable and reusable tracking device 706 is idle and therefore not attached to the item 700 or any item. When the contact sensor is in contact with a surface, such as the surface of item 700, the state information 708 may indicate that the removable and reusable tracking device 706 is active and therefore attached to the item 700. Other components, such as manual elements may be associated with the removable and reusable tracking device 706 to verify the active state of a removable and reusable tracking device 706 and the attachment to an item 700 and not just any surface. For example, a user may wish to set the removable and reusable tracking device 706 upon a surface such as a kitchen counter without indicating that the state information 708 should indicate an active state. By associating a manual element, such as a button, the removable and reusable tracking device 706 and state information 708 may indicate and/or remain idle until additional input in the form of the user interacting with the manual element occurs. In an example, the user may attach the removable and reusable tracking device 706 to the surface of an item 700 and push the button (interact with the manual element) to trigger the state information 708 to indicate an active state and thus identify as being attached with the item 700.

In an embodiment, the user 704 may interact, such as by bringing a mobile phone within proximity of the removable and reusable tracking device 706, with the removable and reusable tracking device 706 itself to send the state information 708. For example, as described above, the removable and reusable tracking device 706 may be configured to utilize NFC technology, such as an NFC chip, that can interact with the user's mobile phone to provide the state information 708 by bringing the mobile phone within a certain proximity of the removable and reusable tracking device 706. The user may utilize a user device, such as a mobile phone or table computer to provide the state information 708 or utilize an application on said user devices to provide the state information for the removable and reusable tracking device to the reusable device tracking system 710 via the networks 712. For example, the mobile phone may be configured or associated with an RFID reader that can act as an intermediary to transmit the state information 708 from the removable and reusable tracking device 706 to the reusable device tracking system 710 via available networks, such as network 712. An application provided by the removable and reusable tracking system described herein may be configured to run on the user device and provide information obtained by the user device, such as from an NFC chip or RFID reader to the reusable device tracking system 710 that can be utilized to determine the state of the removable and reusable tracking device 706. The reusable device tracking system 710 may implement the management module 215 from FIG. 2. In embodiments, the reusable device tracking system 710 may utilize the state information 708, information about the item 700 (such as shelf life), and information about the particular user 704 (delivery preferences, notification preferences, shopping history) to determine a time period before placing a re-order for the item 700. The determined time periods may be dynamically updated based on updated information about the item and the user and maintained in a database such as database 714. The state or relative states of the removable and reusable tracking device 706 may be maintained in database 714. In an embodiment, upon expiration of the determined time period, the reusable device tracking system 710 may provide instructions 716 to order and deliver 718 more of the item 700 to the user 704. In embodiments, upon expiration of the determined time period, the reusable device tracking system 710 may provide a notification to the user 704, via a user device such as a mobile phone, that enables the user to verify the re-order of item 700.

Figure 8:
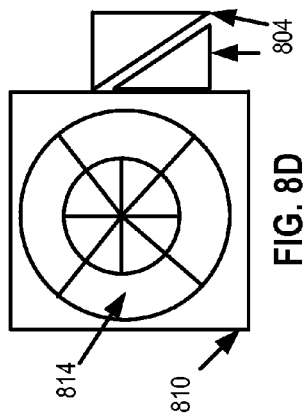
FIG. 8 illustrates several examples of removable and reusable tracking devices as described herein, according to embodiments.
Figure 8:
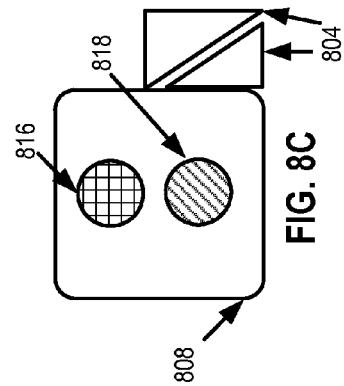
Figure 8:
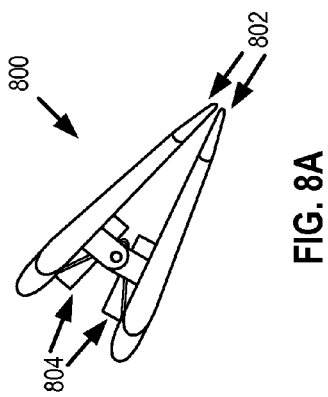
Figure 8:
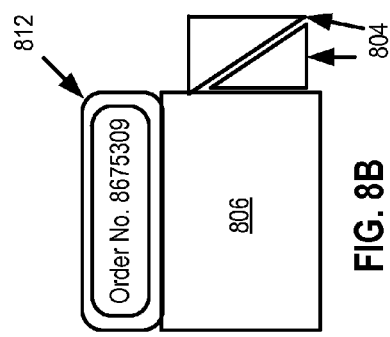

FIG. 8 illustrates several examples of removable and reusable tracking devices as described herein, according to embodiments. As described herein, the removable and reusable tracking devices may utilize or be configured with one or more environmental or sensory outputs and inputs. For example, FIG. 8A includes an example removable and reusable tracking device 800 that includes sensor portions 802 and RFID tags 804 for implementing techniques described herein. The removable and reusable tracking device 800 included in FIG. 8A may represent a spring-loaded clip or clamp. The sensor portions 802 of device 800 may be utilized to indicate an active or idle state of the removable and reusable tracking device 800. For example, when the sensor portions 802 are interrupted, such as by being attached to an item, signals may be provided to the RFID tag or communicated to the management module which may be interpreted to indicate an active state. When the sensor portions 802 are no longer interrupted or are in contact, different signals may be provided to the RFID tag or communicated to the management module directly which may be interpreted to indicate an idle state. The RFID tags 804 may be interacted with by a user device to provide identification information, state information, or location information as described herein to the management module. For example, the user device may be configured or associated with an RFID reader or NFC chip for transmitting information to and from the RFID tags 804 when in proximity of an RFID tag or NFC chip of the RFID tags 804. It should be appreciated that although FIG. 8A includes two sensor portions 802, the removable and reusable tracking device 800 may operate with one sensor portion as described above.

FIG. 8 also includes several other examples of removable and reusable tracking devices 806, 808, and 810, that are configured to utilize or are associated with various environmental or sensory outputs and inputs. The removable and reusable tracking devices 806, 808, and 810 may also be associated with RFID tags 804 similar to FIG. 8A. In FIG. 8B, the example removable and reusable tracking device 806 may be configured to utilize a display device 812, e.g., an e-Ink display or LED screen, for providing various visual feedback including order information, identification information, location information, descriptive information, or any other information that can be generated and provided by the management module. In FIG. 8D, the example removable and reusable tracking device 810 may be configured to utilize an audio output device 814, e.g., a speaker, to provide various sound feedback including random interval noises, language instructions or any other suitable audio information generated and provided by the management module. In FIG. 8C, the example removable and reusable tracking device 808 may be configured with visual indicators 816 and 818, e.g., LEDs or light emitters, for providing different visual feedback such as a series of blinks, varying strobe patterns, or different colors that can indicate feedback information. It should be appreciated that although FIGS. 8A-8D are illustrated with various technological components and encompass some embodiments, any and/or all of the illustrated embodiments can be combined in various combinations. In an embodiment, the various removable and reusable tracking devices can be attached to one or more items utilizing various methods such as different tapes, Velcro, magnetic portions, or any other suitable attachment methods appropriate for attaching a tracking device to an item. Removable and reusable tracking devices may be attached by adhesive tape loops, an adhesive strip with a raised perpendicular portion that a clip associated with the device may attach to, a thumb tack or other pin like structure may be utilized to pierce the packing of the item and attach the removable and reusable tracking device. In embodiments, the removable and reusable tracking devices 800, 806, 808, and 810 may include one or more processors, volatile and non-volatile memory, storage, and other suitable components for obtaining sensory feedback or environmental feedback from the various sensors described herein and transforming and/or providing the feedback for use by the removable and reusable tracking system described herein. Any suitable computer configuration may be utilized for obtaining, capturing, and/or providing the sensory and environmental feedback associated with the removable and reusable tracking devices 800, 806, 808, and 810. Such techniques are well known to those of skill in art and, accordingly, are not described in detail herein.

Figure 9:
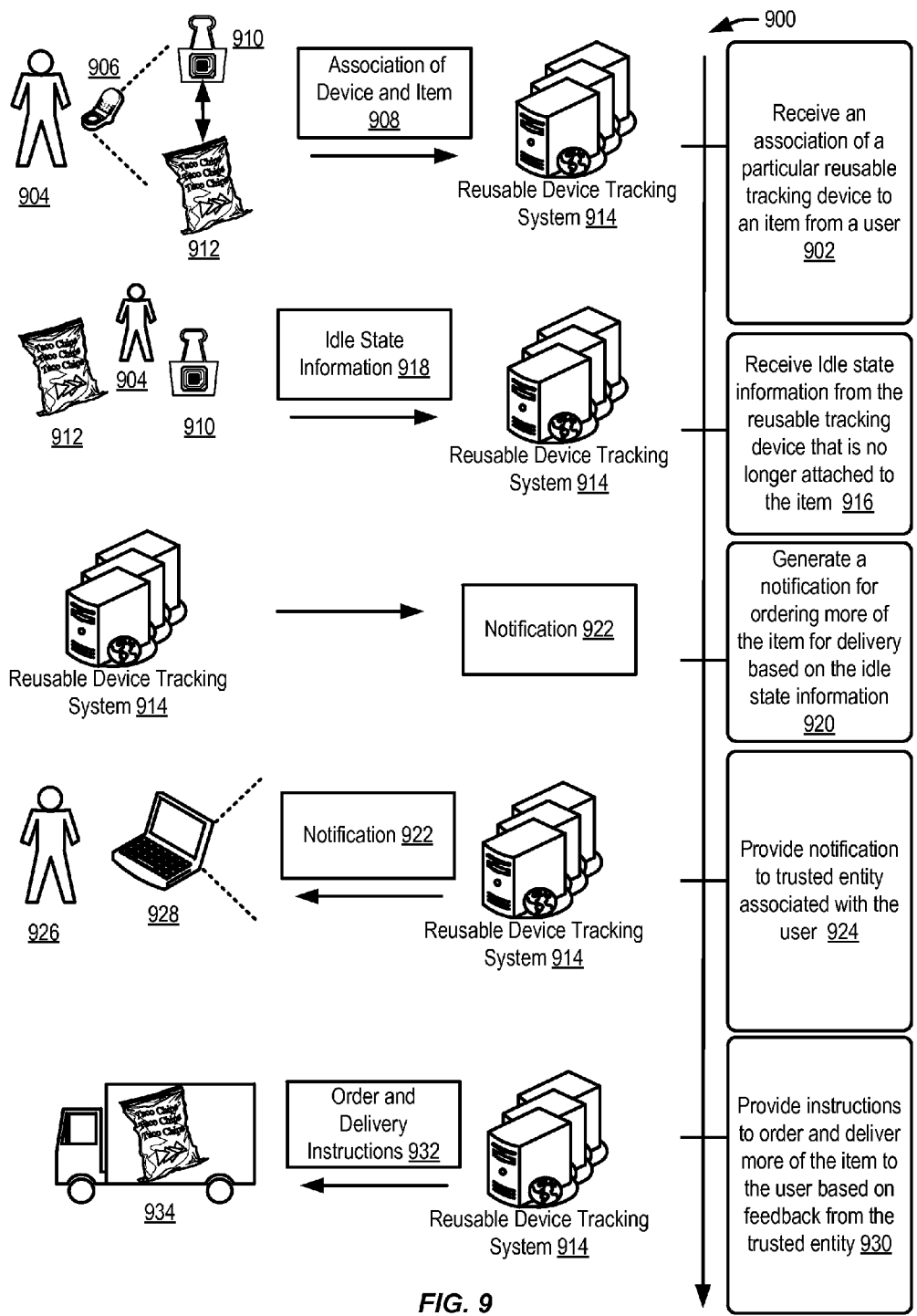
FIG. 9 illustrates an example flow for a reusable tracking device feature as described herein, according to embodiments.

FIG. 9 illustrates an example flow for a reusable tracking device feature as described herein, according to embodiments. The example flow 900 illustrated in FIG. 9 includes one or more operations. However, the order in which the operations are described is not intended to be construed as a limitation, and any number of the described operations can be combined in any order and/or in parallel to implement the described flow. The flow 900 may include receiving an indication of an association between a particular removable and reusable tracking device and an item in a user's possession at 902. In an embodiment, a user 904 may utilize a user device 906 to provide an association indication 908 between a removable and reusable tracking device 910 and an item 912 (taco chips) to a reusable device tracking system 914 via one or more networks (not pictured). As described herein, the user may attach (illustrated by the double sided arrow between 910 and 912) the removable and reusable tracking device 910 to the item 912 and interact with the device 910, via the user device 906 and an application configured to run on the user device 906, to provide identification, location, and association information to the reusable device tracking system 914. The reusable device tracking system 914 may implement the management module 215.

The flow 900 may include receiving idle state information from the removable and reusable tracking device that is no longer attached to the item at 916. In an embodiment, the user 904 may remove the removable and reusable tracking device 910 from the item 912. The removal (indicated by the lack of the double sided arrow between 910 and 912) of the removable and reusable tracking device 910 from the item 912 may trigger the provision of idle state information 918 to the reusable device tracking system 914. The flow 900 may include generating a notification for ordering more of the item for delivery based on the idle state information at 920. In embodiments, the reusable device tracking system 914 may determine a time period that upon expiring would trigger the generation of the notification 922. The notification may be provided upon the expiration of the determined time period, at some time before the expiration of the determined time period, or at some time after the expiration of the determined time period. As described herein, the reusable device tracking system 914 may determine the time period based on the idle state information, information about the user, or information associated with the item 912. The notification may be configured to enable the intended recipient to verify an re-order of the item 912.

The flow 900 may include providing the notification to a trusted entity associated with the user at 924. In an embodiment, the reusable device tracking system 914 may maintain associations or relationships between users (such as user 904) and one or more trusted entities (such as trusted entity 926). The notification 922 may be provided to the trusted entity 926 via a user device such as user device 928 that may include a PC, a mobile PC, a table PC, a mobile device, or any suitable user device suitable for communicating notifications. The notification may include a short message service text message, an email, a messing service message, a social network message, or any other suitable notification technology. The flow 900 may conclude at 930 by providing instructions to order and deliver more of the item to the user based on feedback from the trusted entity. In an embodiment, the reusable device tracking system 914 may receive verification or authorization from the trusted entity 926 via user device 928 to re-order the item 912 on behalf of the user 904. The reusable device tracking system 914 may provide order and delivery instructions 932 to an entity 934 capable of fulfilling the re-order and delivering the item 912 to the user 904. For example, the reusable device tracking system 914 may communicate with an electronic marketplace, an online retailer, or other retailer to fulfill the re-order of the item 912 and delivery of the item 912 to user 904.

Figure 10:
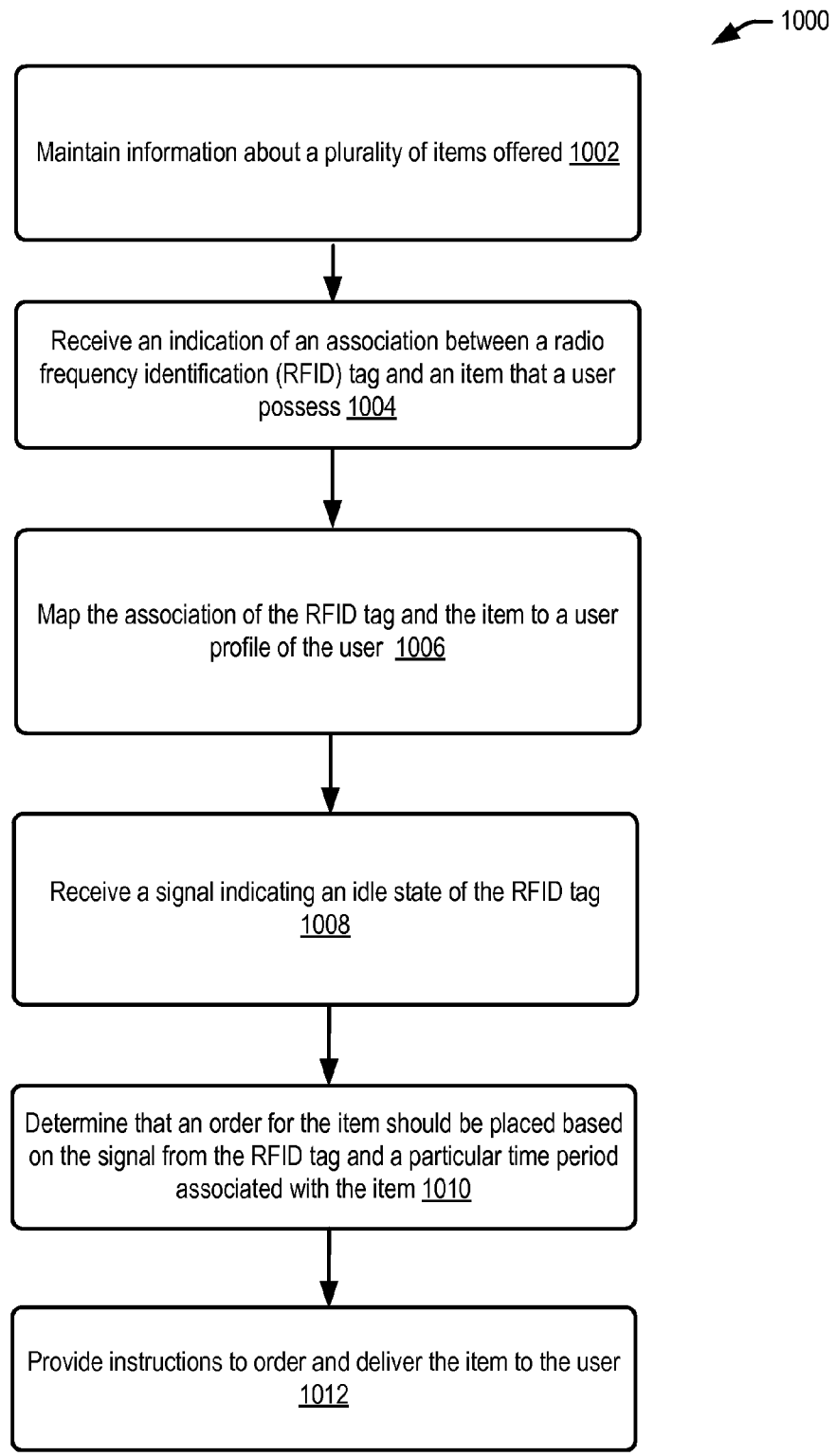
FIG. 10 illustrates a flow diagram depicting example acts for implementing techniques relating to a reusable tracking device feature as described herein, according to embodiments.

FIG. 10 illustrates a flow diagram depicting example acts for implementing techniques relating to a reusable tracking device feature as described herein, according to embodiments. The management module 215 (FIGS. 2 and 3) may perform the process 1000 of FIG. 10. The process 1000 begins at 1002 by maintaining information about a plurality of items offered at 1002. As described herein, the management module 215 may maintain and update information about a plurality of items offered by an electronic marketplace. The information may include metrics or parameters for each item including appropriate environmental conditions, historical determined time periods for re-ordering each item, and processing and delivery instructions. The process 1000 may include receiving an indication of an association between an RFID tag and an item that a user possesses at 1004. For example, the user may utilize an application configured to run on a user device to provide the association between the item and the RFID tag.

The process 1000 may include mapping the association of the RFID tag and the item to a user profile of the user at 1006. In an embodiment, the management module 215 may maintain separate user profiles for each user associated with the inventory management system or removable and reusable tracking device features described herein. The user profile information may include contact information, billing information, trusted entity relationships or associations, shopping history, user preferences, item preferences, and historical determined time periods associated with the user for re-ordering particular items. The process 1000 may include receiving a signal indicating an idle state of the RFID tag at 1008. For example, the RFID tag may automatically send an idle state signal to the management module, via available networks, based on sensory contacts associated with the RFID tag coming into contact or no longer being interrupted (because the tag has been removed from the associated item and the contacts were previously interrupted). The process 1000 may include determining that an order for the item should be placed based on the signal from the RFID tag and a particular time period associated with the item at 1010. In an embodiment, the management module may maintain shelf life information or historical time period information associated with each item offered by services described herein or by electronic marketplaces/ online retailers. In embodiments, the management module may provide instructions to order and deliver the item to the user upon expiration of the particular time period associated with the item. The process 1000 may conclude at 1012 by providing instructions to order and deliver the item to the user. The instructions may be provided to an entity such as an electronic marketplace, an online retailer, or other retailer capable of fulfilling the re-order of the item and delivering the item to the user. In accordance with at least one embodiment, after the user removes the RFID tag from the item a notification may be generated and transmitted to the user to verify the re-order. The user can utilize the notification to decline a re-order of the item. In embodiments, the user may, after removing the RFID tag from the item, form a new association between the RFID tag and a new item. The same processes described in FIGS. 9 and 10 can be implemented for the new association of the RFID tag and the new item. Thus, the user can, in embodiments, reuse the same removable and reusable tracking device for re-ordering items on their behalf.

Figure 11:
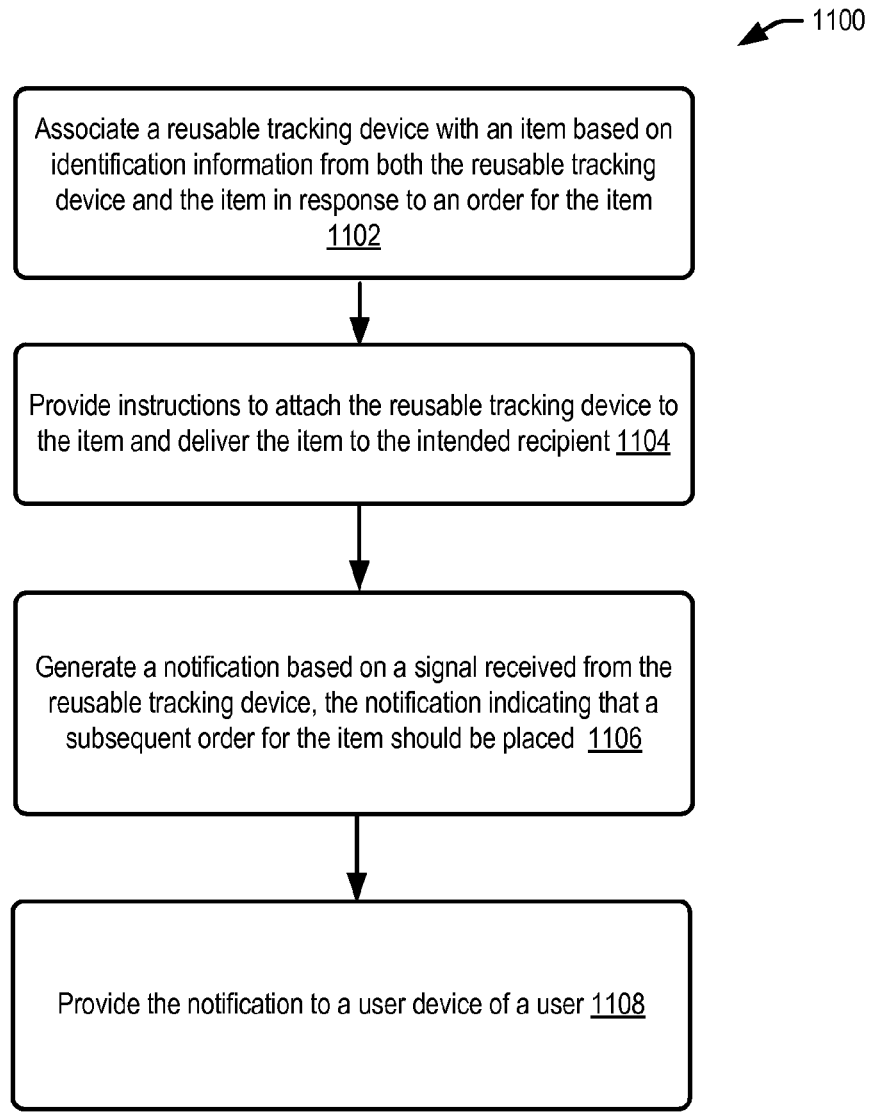
FIG. 11 illustrates a flow diagram depicting example acts for implementing techniques relating to a reusable tracking device feature as described herein, according to embodiments.

FIG. 11 illustrates a flow diagram depicting example acts for implementing techniques relating to a reusable tracking device feature as described herein, according to embodiments. The management module 215 (FIGS. 2 and 3) may perform the process 1100 of FIG. 11. The process 1100 begins at 1102 by associating a removable and reusable tracking device with an item based on identification information from both the removable and reusable tracking device and the item in response to an order for the item. In an embodiment, the inventory management system may attach the removable and reusable tracking device to the item included in the order before providing the tracked item to the ordering entity or user. The process 1100 may include providing instructions to attach the reusable tracking device to the item and deliver the item to the intended recipient at 1104. As described herein, the management module 215 may map the association of the tracked item to the order for the item. The process 1100 may include generating a notification based on a signal received from the reusable tracking device at 1106. The notification may indicate that a subsequent order for the item may be placed on behalf of the user. The process 1100 may conclude at 1108 by providing the notification to a user device of a user. In an embodiment, the removable and reusable tracking device feature may include automatically ordering the item on behalf of the user instead of waiting for feedback provided by the user via the notification as described herein.

Figure 12:
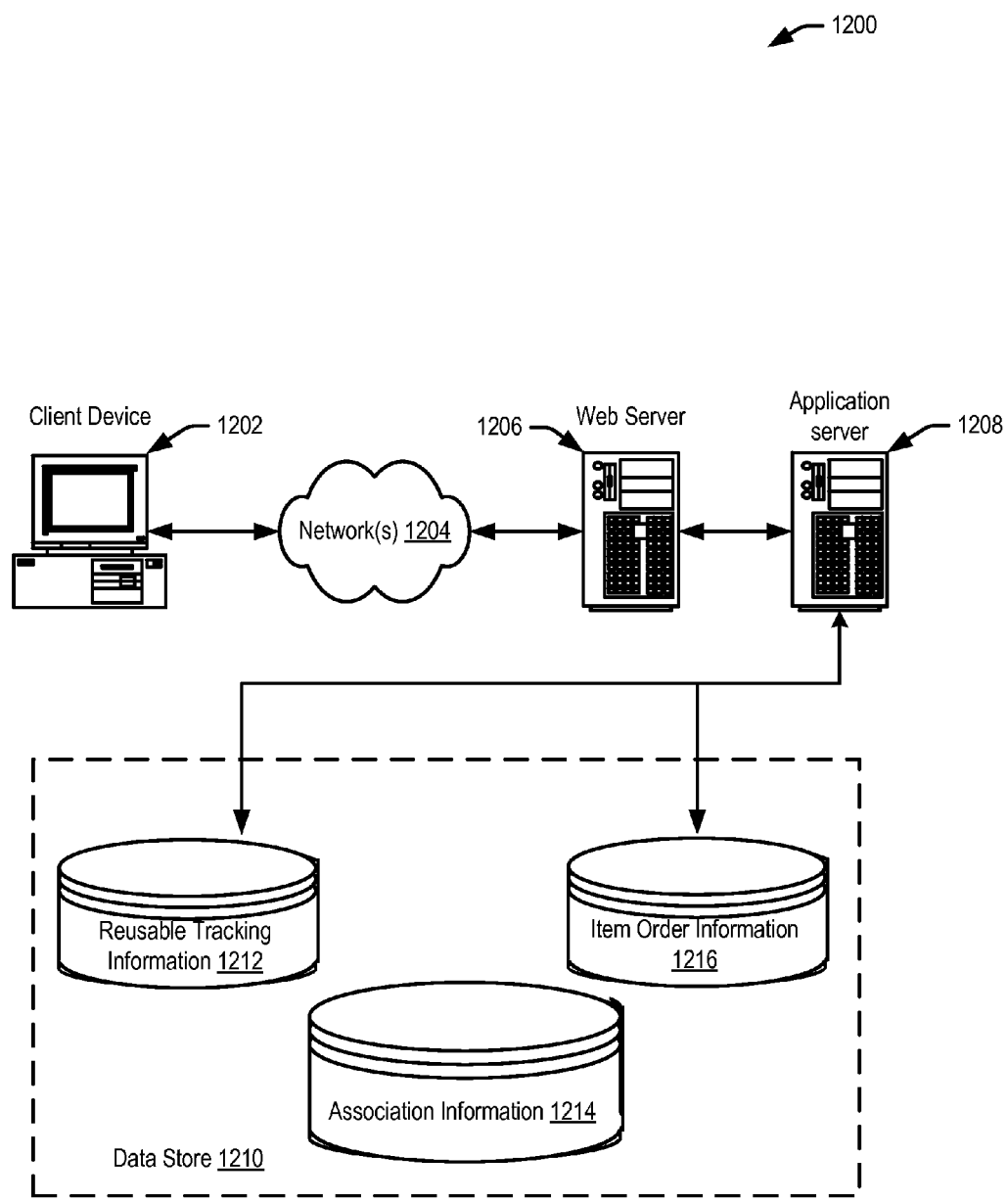
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing reusable tracking information 1212 and item order information 1216, which can be used to serve content for the production side. The data store also is shown to include a mechanism for storing association information 1214, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving, by a computer system, an order for an item stored in a workspace;
    providing first instructions, to an associate at a workstation that is located in the workspace, to attach a radio frequency identification (RFID) tag to the item, wherein the RFID tag is removable and reusable and is configured to provide a first signal when attached to the item, the RFID tag being attached to the item by at least use of a clip associated with the RFID tag, the clip including at least a contact sensor configured to provide the first signal indicating an active state when attached to the item and to provide a second signal indicating an idle state when unattached to the item;
    receiving unique identification information for the RFID tag and the item based at least in part on the associate scanning the RFID tag and the item with a user device at the workstation;
    associating, by the computer system, the RFID tag and the item based at least in part on the unique identification information for the RFID tag and the item;
    mapping, by the computer system, the order with the RFID tag and the item;
    receiving an indication that the item and the associated RFID tag are located in a particular location of the workspace based at least in part on the first signal provided by the associated RFID tag;
    providing second instructions to remove the RFID tag from the item based at least in part on the indication of the particular location;
    disassociating, by the computer system, the RFID tag from the item based at least in part on the indication thereby removing the mapping of the RFID tag with the item and the order, wherein the RFID tag is configured to provide the second signal when unattached to the item;
    receiving, by the computer system, another order for another item stored in the workspace; and
    providing third instructions, to an associate at a workstation that is located in the workspace, to attach the RFID tag to the other item, wherein the RFID tag is configured to provide the first signal when attached to the other item.

2. The computer-implemented method of claim 1, wherein the RFID tag is associated with one or more items stored in the workspace in response to an inventory transfer request.

3. The computer-implemented method of claim 1, wherein providing the first instructions and the second instructions include utilizing one or more outputs associated with the RFID tag including visual outputs, audio outputs, or vibration outputs.

4. A system comprising:
    a processor; and
    memory in communication with the processor, the memory including computer-executable instructions that, when executed by the processor, cause the computer system to at least:
    receive inventory transfer information for inventory stored in a workspace;
    receive a first indication that a removable and reusable tracking device is associated with the inventory based at least in part on the inventory transfer information, the first indication provided by the removable and reusable tracking device and corresponding to an active state, the removable and reusable tracking device attached to the inventory by at least use of a clip associated with the removable and reusable tracking device, the clip including at least a contact sensor configured to provide the first indication of the active state when attached to the inventory and to provide a second indication of an idle state when unattached to the inventory;

map the inventory transfer information to the removable and reusable tracking device and the inventory based at least in part on the first indication;

determine a location of the inventory within the workspace based at least in part on location information associated with the removable and reusable tracking device;

remove the mapping of the removable and reusable tracking device with the inventory transfer information and the inventory based at least in part on the location information indicating that the inventory is located at a particular location within the workspace; and receive the second indication that the removable and reusable tracking device is not associated with the inventory, the second indication provided by the removable and reusable tracking device and corresponding to the idle state.

5. The system of claim 4, wherein the removable and reusable tracking device includes one or more contact sensors, the first indication being provided in response to the one or more contact sensors being interrupted.

6. The system of claim 4, wherein the location information associated with the removable and reusable tracking device is received via a wireless communication network.

7. The system of claim 4, wherein determining the location of the inventory within the workspace is further based at least in part on identification information provided by at least one of an access point in the workspace, a portion of the workspace, an inventory transfer station within the workspace, a camera within the workspace, a machine readable identifier scanner associated with the workspace, a user device associated with the workspace, or an operator in the workspace.

8. The system of claim 4, wherein the removable and reusable tracking device is associated with one or more sensors configured to provide the first indication corresponding to the active state when attached to the inventory and to provide the second indication corresponding to the idle state when unattached to the inventory.

9. The system of claim 4, wherein the computer-executable instructions, when executed by the processor, further cause the computer system to at least provide feedback to the removable and reusable tracking device based at least in part on the determined location of the inventory within the workspace and information associated with the inventory, the feedback indicating that the inventory is currently incorrectly located within the workspace.

10. The system of claim 9, wherein the feedback provided to the removable and reusable tracking device includes utilizing at least one of audio feedback, visual feedback, or vibration feedback.

11. A non-transitory computer-readable storage medium storing computer-executable instructions that, when executed by a computer system, configure the computer system to perform operations comprising:

maintaining state information for one or more removable and reusable tracking devices, the state information indicating an association with inventory that is stored within a workspace;

associating a particular removable and reusable tracking device and a particular inventory item to an inventory transfer request based at least in part on the state information provided by the particular removable and reusable tracking device, the state information indicating that the particular removable and reusable tracking device is attached to the particular inventory item, the particular removable and reusable tracking device being attached to the particular inventory item by at least use of a clip associated with the particular removable and reusable tracking device, the clip including at least a contact sensor configured to provide a first signal indicating an active state for the state information when attached to the particular inventory item and to provide a second signal indicating an idle state for the state information when unattached to the particular inventory item;

tracking a location of the particular inventory item within the workspace based at least in part on information associated with the particular removable and reusable tracking device that is attached to the particular inventory item;

disassociating the particular removable and reusable tracking device from the particular inventory item and the inventory transfer request based at least in part on the information indicating that the particular inventory item is located at a particular location within the workspace; and updating the state information for the particular removable and reusable tracking device based at least in part on the particular location of the particular inventory item within the workspace, the updated state information indicating that the particular removable and reusable tracking device is removed from the particular inventory item.

12. The computer readable medium of claim 11, wherein the particular removable and reusable tracking device is configured to utilize one or more environmental output/input sensors and one or more visual or audio indicators.

13. The computer readable medium of claim 11, wherein the executable instructions further configure the computer system to generate a distress signal based at least in part on the location of the particular inventory item within the workspace, the distress signal configured to be output by the particular removable and reusable tracking device and indicating an incorrect location of the particular inventory item within the workspace.

14. The computer readable medium of claim 11, wherein the executable instructions further configure the computer system to maintain a history log of locations of the particular inventory item within the workspace.

15. The computer readable medium of claim 11, wherein the particular removable and reusable tracking device is configured to capture one or more environmental metrics of a specified area around the attached particular inventory item.

16. The computer readable medium of claim 15, wherein the executable instructions further configure the computer system to maintain a respective range for each environmental metric of the one or more environmental metrics based at least in part on the particular inventory item.

17. The computer readable medium of claim 16, wherein the executable instructions further configure the computer system to provide feedback to the particular removable and reusable tracking device based at least in part on the captured one or more environmental metrics and the respective range for each environmental metric.

* * * * *